United States Patent
Cohen et al.

(10) Patent No.: US 11,468,550 B2
(45) Date of Patent: Oct. 11, 2022

(54) UTILIZING OBJECT ATTRIBUTE DETECTION MODELS TO AUTOMATICALLY SELECT INSTANCES OF DETECTED OBJECTS IN IMAGES

(71) Applicant: Adobe Inc., San Jose, CA (US)

(72) Inventors: Scott Cohen, Sunnyvale, CA (US); Zhe Lin, Fremont, CA (US); Mingyang Ling, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 34 days.

(21) Appl. No.: 16/518,850

(22) Filed: Jul. 22, 2019

(65) Prior Publication Data

US 2021/0027448 A1  Jan. 28, 2021

(51) Int. Cl.
| | | |
|---|---|---|
| G06T 7/00 | (2017.01) | |
| G06T 7/70 | (2017.01) | |
| G06T 7/90 | (2017.01) | |
| G06T 11/60 | (2006.01) | |
| G06F 16/583 | (2019.01) | |
| G06F 40/205 | (2020.01) | |

(52) U.S. Cl.
CPC ........ *G06T 7/0002* (2013.01); *G06F 16/5838* (2019.01); *G06F 16/5854* (2019.01); *G06F 40/205* (2020.01); *G06T 7/70* (2017.01); *G06T 7/90* (2017.01); *G06T 11/60* (2013.01); *G06T 2207/20084* (2013.01); *G06T 2210/12* (2013.01)

(58) Field of Classification Search
CPC ........... G06T 11/60; G06T 2207/20084; G06T 2210/12; G06T 7/0002; G06T 7/70; G06T 7/90

See application file for complete search history.

(56) References Cited

U.S. PATENT DOCUMENTS

| 6,389,168 B2 | 5/2002 | Altunbasak et al. |
| 6,469,706 B1 | 10/2002 | Syeda-Nahmood |

(Continued)

FOREIGN PATENT DOCUMENTS

| CN | 103366178 A | 10/2013 |
| CN | 107563494 A | 1/2018 |

(Continued)

OTHER PUBLICATIONS

Kirillov, Alexander & Girshick, Ross & He, Kaiming & Dollar, Piotr. (2019). Panoptic Feature Pyramid Networks. 6392-6401. 10.1109/CVPR.2019.00656.

(Continued)

*Primary Examiner* — Manuchehr Rahmjoo
(74) *Attorney, Agent, or Firm* — Keller Preece PLLC

(57) ABSTRACT

The present disclosure relates to an object selection system that accurately detects and automatically selects target instances of user-requested objects (e.g., a query object instance) in a digital image. In one or more embodiments, the object selection system can analyze one or more user inputs to determine an optimal object attribute detection model from multiple specialized and generalized object attribute models. Additionally, the object selection system can utilize the selected object attribute model to detect and select one or more target instances of a query object in an image, where the image includes multiple instances of the query object.

20 Claims, 20 Drawing Sheets

(56) References Cited

U.S. PATENT DOCUMENTS

| | | |
|---|---|---|
| 8,107,726 B2 | 1/2012 | Xu et al. |
| 8,385,688 B2 | 2/2013 | Gong et al. |
| 8,818,024 B2 | 8/2014 | Chen et al. |
| 9,129,191 B2 | 9/2015 | Cohen et al. |
| 9,171,230 B2 | 10/2015 | Jiang et al. |
| 9,576,223 B2 | 2/2017 | Aupetit et al. |
| 9,619,488 B2 | 4/2017 | Ambardekar et al. |
| 9,720,934 B1 | 8/2017 | Dube et al. |
| 9,746,981 B2 | 8/2017 | Zachut et al. |
| 9,858,496 B2 | 1/2018 | Sun et al. |
| 10,146,751 B1 | 12/2018 | Zhang |
| 10,192,129 B2 | 1/2019 | Price et al. |
| 10,216,766 B2 | 2/2019 | Lin et al. |
| 10,496,880 B2 | 12/2019 | Ye |
| 10,713,794 B1 | 7/2020 | He et al. |
| 10,740,647 B2 | 8/2020 | Du et al. |
| 10,893,283 B2 | 1/2021 | Chen et al. |
| 11,182,408 B2 | 11/2021 | Wu et al. |
| 2003/0179213 A1 | 9/2003 | Liu |
| 2003/0198380 A1 | 10/2003 | Shin et al. |
| 2003/0233224 A1 | 12/2003 | Marchisio et al. |
| 2008/0069444 A1 | 3/2008 | Wilensky |
| 2009/0281925 A1 | 11/2009 | Winter et al. |
| 2010/0158412 A1 | 6/2010 | Wang et al. |
| 2010/0166321 A1 | 7/2010 | Sawant et al. |
| 2011/0026835 A1 | 2/2011 | Ptucha et al. |
| 2011/0029553 A1 | 2/2011 | Bogart et al. |
| 2011/0085739 A1 | 4/2011 | Zhang et al. |
| 2011/0216973 A1 | 9/2011 | Mojsilovic |
| 2013/0257886 A1 | 10/2013 | Kerofsky et al. |
| 2014/0334722 A1 | 11/2014 | Bloore et al. |
| 2015/0169142 A1 | 6/2015 | Longo et al. |
| 2015/0170005 A1 | 6/2015 | Cohen et al. |
| 2015/0213058 A1 | 7/2015 | Ambardekar et al. |
| 2015/0228086 A1 | 8/2015 | Maurer et al. |
| 2015/0379006 A1 | 12/2015 | Dorner et al. |
| 2016/0342863 A1* | 11/2016 | Kwon ............... G06F 16/51 |
| 2017/0017696 A1 | 1/2017 | Alonso |
| 2017/0083752 A1 | 3/2017 | Saberian et al. |
| 2017/0140236 A1 | 5/2017 | Price et al. |
| 2017/0206431 A1 | 7/2017 | Sun et al. |
| 2017/0255378 A1 | 9/2017 | Desai |
| 2017/0277948 A1 | 9/2017 | Dhua et al. |
| 2017/0287137 A1 | 10/2017 | Lin et al. |
| 2018/0089203 A1 | 3/2018 | Soni et al. |
| 2018/0108137 A1 | 4/2018 | Price et al. |
| 2018/0121768 A1 | 5/2018 | Lin et al. |
| 2018/0267997 A1 | 9/2018 | Lin et al. |
| 2019/0019318 A1 | 1/2019 | Cinnamon et al. |
| 2019/0108250 A1 | 4/2019 | Miller et al. |
| 2019/0130229 A1 | 5/2019 | Lu et al. |
| 2019/0252002 A1 | 8/2019 | Ding et al. |
| 2019/0354609 A1 | 11/2019 | Huang et al. |
| 2020/0020108 A1 | 1/2020 | Pao et al. |
| 2020/0175344 A1 | 6/2020 | Li et al. |
| 2020/0218931 A1 | 7/2020 | Karlinsky et al. |
| 2020/0250538 A1 | 8/2020 | Li et al. |
| 2020/0302230 A1 | 9/2020 | Chang |
| 2020/0334487 A1 | 10/2020 | Du et al. |
| 2020/0334501 A1 | 10/2020 | Lin et al. |
| 2021/0027471 A1 | 1/2021 | Cohen et al. |
| 2021/0027497 A1 | 1/2021 | Ding et al. |
| 2021/0192375 A1 | 6/2021 | Xia et al. |

FOREIGN PATENT DOCUMENTS

| | | |
|---|---|---|
| EP | 3 300 024 A1 | 3/2018 |
| WO | WO 2017/007626 A1 | 1/2017 |

OTHER PUBLICATIONS

Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).

Wang, Jiang, et al. "Learning fine-grained image similarity with deep ranking." Proceedings of the IEEE Conference on Computer Vision and Pattern Recognition. 2014. (Year: 2014).

Niblack, Carlton Wayne, et al. "Q.BIC project: querying images by content, using color, texture, and shape." Storage and retrieval for image and video databases. vol. 1908. International Society for Optics and Photonics, 1993. (Year: 1993).

Wan et al, Deep Learning for Content-Based Image Retrieval: Comprehensive Study, Published in MM '14: Proceedings of the ACM International Conference on Multimedia: Nov. 3-7, 2014, Orlando, pp. 157-166. http://doi.org/10.1145/2647868.2654948 (Year: 2014).

Carion, Nicolas et al. "End-to-End Object Detection with Transformers," arXiv preprint arXiv:2005.12872 (2020).

U-net architecture and use techniques and approaches found in Olaf Ronneberger et al., "U-Net: Convolutional Networks for Biomedical Image Segmentation," submitted on May 18, 2015, arXiv:1505.049597.

Wang et al. in Joint Object and Part Segmentation using Deep Learned Potentials, in Proc. International Conference on Computer Vision (ICCV), 2015.

J. Dong et al.; Towards Unified Human Parsing and Pose Estimation, in CVPR, pp. 843-850, 2014.

U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.

Ning Xu et al., "Deep GrabCut for Object Selection," published Jul. 14, 2017.

S. Ren, K. He, R. Girshick, and J. Sun, Faster r-cnn: Towards real-time object detection with region proposal networks, NIPS, 2015.

Yi-Hsuan Tsai et al., "Sky is Not the Limit: Semantic-Aware Sky Replacement," ACM Transactions on Graphics (SIGGRAPH), 2016.

Yufei Wang et al., "Concept Mask: Large-Scale Segmentation from Semantic Concepts," The European Conference on Computer Vision (ECCV), Aug. 18, 2018.

Combined Search and Examination Report as received in United Kingdom Application GB2004362.6 dated Nov. 13, 2020.
Combined Search and Examination Report as received in UK Application GB2005865.7 dated Jan. 11, 2021.
Combined Search and Examination Report as received in United Kingdom Application GB2005714.7 dated Sep. 3, 2020.
U.S. Appl. No. 15/921,492, Apr. 2, 2020, Notice of Allowance.
Intention to Grant as received in United Kingdom Application GB1817588.5 dated Aug. 13, 2020.

J. Uijlings, K. van de Sande, T. Gevers, and A. Smeulders. Selective Search for Object Recognition, IJCV, 2013.

Joseph Redmon, Santosh Divvala, Ross Girshick, Ali Farhadi: You Only Look Once: Unified, Real-Time Object Detection, arXiv:1506.02640, May 6, 2016.

Bency, Archith John, et al. "Weakly supervised localization using deep feature maps." European Conference on Computer Vision. Springer, Cham, 2016, See Abstract and section 3.4.

Bolanos, Marc, and Petia Radeva. "Simultaneous food localization and recognition." 2016 23rd International Conference on Pattern Recognition (ICPR). IEEE, 2016 See Abstract, Figure 3 and the Methodology section.

Combined Search and Examination Report as received in United Kingdom Application GB1817588.5 dated Apr. 8, 2019.
U.S. Appl. No. 15/921,492, Dec. 27, 2019, Office Action.
Combined Search and Examination Report as received in United Kingdom Application GB2005704.8 dated Sep. 24, 2020.
Examination Report as received in Australian application 2018250370 dated Jun. 10, 2021.
U.S. Appl. No. 16/518,880, Apr. 7, 2021, Notice of Allowance.
U.S. Appl. No. 16/518,810, Apr. 16, 2021, 1st Action Office Action.
U.S. Appl. No. 16/518,810, Jul. 15, 2021, Office Action.
U.S. Appl. No. 16/518,795, May 6, 2021, Office Action.

(56) References Cited

OTHER PUBLICATIONS

U.S. Appl. No. 16/817,418, Mar. 22, 2021, Notice of Allowance.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2021, Notice of Allowance.
Examination Report as received in Australian application 2020202602 dated Oct. 18, 2021.
Intention to Grant as received in Australian application 2018250370 dated Oct. 21, 2021.
U.S. Appl. No. 16/518,810, Oct. 27, 2021, Office Action.
Intention to Grant as received in United Kingdom Application GB2005865.7 dated Mar. 23, 2022.
Intention to Grant as received in United Kingdom Application GB2004362.6 dated Apr. 8, 2022.
U.S. Appl. No. 16/518,810, Apr. 14, 2022, Office Action.
U.S. Appl. No. 16/800,415, Apr. 4, 2022, 1st Action Office Action.
U.S. Appl. No. 16/919,383, Feb. 10, 2022, Notice of Allowance.
U.S. Appl. No. 16/800,415, Feb. 17, 2022, Preinterview 1st Office Action.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
Examination Report as received in Australian application 2020201988 dated Oct. 29, 2021.
Notice of Grant as received in Australian application 2020201988 dated Mar. 17, 2022.
U.S. Appl. No. 16/518,795, Dec. 7, 2021, Notice of Allowance.
Examination Report as received in Australian application 2020202601 dated Nov. 5, 2021.
Examination Report as received in United Kingdom application GB2005865.7 dated Dec. 14, 2021.
U.S. Appl. No. 16/518,810, dated Aug. 10, 2022, Office Action.
U.S. Appl. No. 16/800,415, dated Jul. 20, 2022, Notice of Allowance.

\* cited by examiner

UTILIZING OBJECT ATTRIBUTE DETECTION MODELS TO AUTOMATICALLY SELECT INSTANCES OF DETECTED OBJECTS IN IMAGES

CROSS-REFERENCE TO RELATED APPLICATIONS

This application is related to concurrently filed U.S. patent application Ser. No. 16/518,795, filed Jul. 22, 2019 and U.S. patent application Ser. No. 16/518,810, filed Jul. 22, 2019, both of which are incorporated by reference herein in their entirety.

BACKGROUND

Recent years have brought about a significant increase in digital image editing. Indeed, advances in both hardware and software have increased the ability of individuals to capture, create, and edit digital images. For instance, the hardware on most modern computing devices (e.g., servers, desktops, laptops, tablets, and smartphones) enables digital image editing without significant lag time or processing delays. Similarly, improvements in software enable individuals to modify, combine, filter, or otherwise edit digital images. Examples of editing digital images include detecting an object, copying the object from one image into a new background, or removing an object from an image.

Notwithstanding these improvements in digital image editing, conventional systems have a number of problems in relation to flexibility, accuracy, and efficiency of operation in image editing systems, particularly with respect to detecting and selecting objects in digital images. As an example, many conventional systems have limited functionality in the types of objects they can detect in an image. Indeed, conventional image editing systems are often limited to a small number of object classes. Further, conventional systems primarily detect only a small subset of objects within an object class.

In additional, conventional systems are inaccurate. For instance, many conventional systems that provide object detection often identify the wrong objects or fail to identify any object. For example, when a user desires a selection of a target instance of an object, conventional systems often identify and group multiple instances of the object in a single selection as these systems cannot distinguish between instances of a detected object in an image.

Also, some conventional systems are inaccurate because they provide imprecise results. For instance, while a few conventional systems can select individual masks of an object, the boundaries of these masks are rough and imprecise. Indeed, these conventional systems often produce object masks that over include additional portions of the image or do not include the entire object. As a result, a user must manually correct the selection and/or manually select the desired object.

Furthermore, conventional systems are inefficient. For instance, conventional systems have significant shortfalls in relation to automatic object detection and selection. For example, many conventional systems that detect objects are end-to-end neural networks. When a fault occurs, or the desired result is not achieved, users or even creators of the system are unable to locate which component of the system is not working correctly. Rather, the entire system must be retrained and adjusted until the desired result is achieved—a process that can take significant amounts of time and computing resources.

In addition, many conventional systems provide inefficient mouse input-based tools that further require users to manually select a desired object. These tools are often imprecise as well as challenging for many selection tasks. As a result, significant time and user interactions with different selection tools by the user waste substantial computing resources in detecting, displaying, selecting, and correcting object selections in digital images.

These, along with additional problems and issues exist in image editing systems with respect to detecting and selecting objects in digital images.

BRIEF SUMMARY

Embodiments of the present disclosure provide benefits and/or solve one or more of the foregoing or other problems in the art with systems, non-transitory computer-readable media, and methods for automatically selecting a target instance of an object in a digital image based on natural language-based inputs. For instance, the disclosed systems can analyze one or more user inputs to determine an optimal object attribute detection model (e.g., object attribute neural network) from multiple specialized and generalized object attribute models. Further, the disclosed systems can utilize the selected object attribute model to identify the target instance of an object in an image that includes multiple instances of the object.

To illustrate, the disclosed systems can identify a user selection query that requests selection of a target instance of an object within an image. In particular, the user selection query can indicate a query object and an object attribute corresponding to the query object. Based on the user selection query, the disclosed systems can detect multiple instances of the query object in the image. As an example, if there are multiple instances of a desired object in an image, the disclosed systems can identify and select each instance individually. In addition, the disclosed systems can determine an object attribute detection model based on the object attribute and utilize the object attribute detection model to select a particular object instance. Further, the disclosed systems can provide the selected particular object instance selected in the image.

Indeed, in many embodiments, the disclosed systems can accurately detect specified instances of objects based on the user query. For example, when multiple instances of a desired object are present in an image, the disclosed systems can identify and select each instance individually. Additionally, the disclosed systems can identify a specified attribute from the selection query and select the instance of the object that matches the specified attribute. In various embodiments, the disclosed systems can select instances of objects based on color, position, size, location, material, expression, shape, or other attributes.

While this summary refers to systems for simplicity, the summary also applies to certain disclosed methods and non-transitory computer-readable media. The following description sets forth additional features and advantages of one or more embodiments of the disclosed systems, computer media, and methods. In some cases, such features and advantages will be evident to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
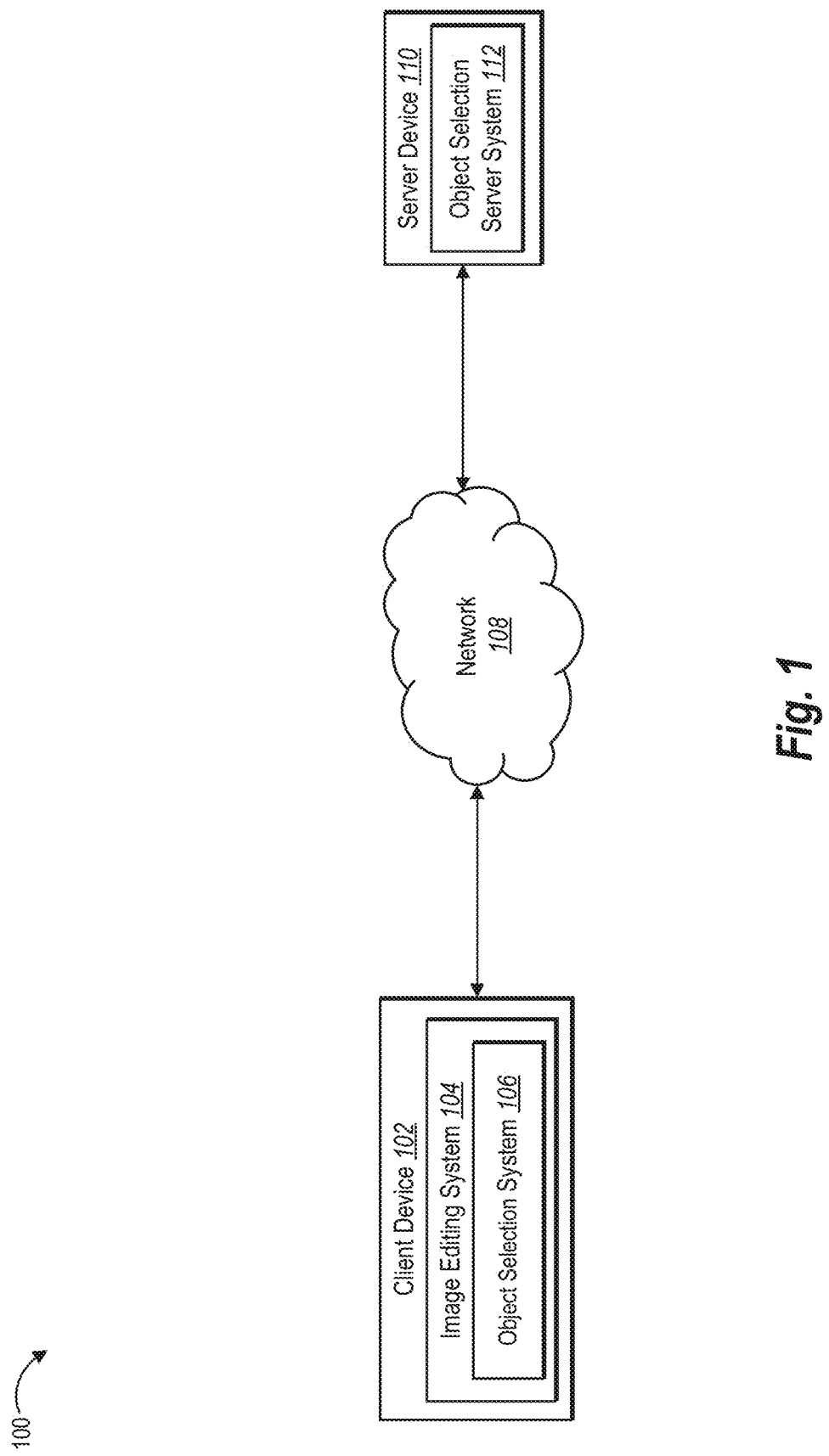
FIG. 1 illustrates a schematic diagram of an environment in which an object selection system operates in accordance with one or more embodiments.

This disclosure describes one or more embodiments of an object selection system that accurately detects and automatically selects target instances of user-requested objects (e.g., a query object instance) in a digital image. In particular, in one or more embodiments, the object selection system can analyze one or more user inputs to determine an optimal object attribute detection model from multiple specialized and generalized object attribute models. Additionally, the object selection system can utilize the selected object attribute model to detect and select one or more target instances of a query object in an image, where the image includes multiple instances of the query object.

To illustrate, the object selection system can identify a user selection query (e.g., a text string) that requests the selection of a particular object instance within an image. In particular, the selection query can indicate a query object and an object attribute corresponding to the query object. Based on the selection query, the object selection system can detect multiple instances of the query object in the image. In addition, the object selection system can determine which object attribute detection model to utilize based on analyzing the object attribute in the selection query. Further, the object selection system can detect and then select the target query object instance in the image utilizing the determined object attribute detection model. Lastly, the object selection system can select the detected query object instance automatically for the user within the image.

In one or more embodiments, the object selection system can detect objects corresponding to a variety of object types and classes. In this manner, a user can request that the object selection system find a large number of objects. In various embodiments, the object selection system can utilize an object selection pipeline that provides a framework for the object selection system to determine which object detection neural networks to utilize for detecting the target query object instance requested by a user.

To illustrate, in one or more embodiments, the object selection system can detect a selection query (e.g., a text string) from a user requesting to automatically select a target instance of an object within an image and/or edit the image with respect to the particular object instance. In addition, the object selection system can parse the query text string (hereafter "query string") and/or utilizes natural language processing to determine various parts of speech, such as nouns and adjectives within the query. For example, a noun in the query string corresponds to the query object the user is requesting the object selection system to automatically select in an image. Further, an adjective in the query string identifies which instances of the query objects to select when multiple query objects are included in the image.

In one or more embodiments, the object selection system can analyze the query object in a query string to determine an object class. Based on the object class, the object selection system can select and utilize an object detection neural network to detect the query object within the image. In additional embodiments, the object selection system can detect multiple instances of the query object within the image.

In various embodiments, upon detecting the query object, the object selection system generates an approximate boundary (e.g., a bounding box) around the object within the image. In additional embodiments, the object selection system provides the detected query object to an object mask neural network. The object mask neural network, in various embodiments, generates an object mask of the detected object. Indeed, the object mask enables the object selection system to select the detected query object in the image.

In some embodiments, the object selection system generates multiple bounding boxes and/or object masks for multiple instances of a detected query object. In these embodiments, the object selection system can provide multiple instances of the detected query object to the user. In additional embodiments, the object selection system can provide individual selections of each instance when multiple instances of the detected query object are detected.

As mentioned above, in some embodiments, the query string includes one or more object attributes that specify a target instance of the query object. For example, the query string indicates a size, color, position, location, material, emotion, or another attribute of the query object. In response to detecting an object attribute in the query string, the object selection system can further determine which instance of the query object to select. In particular, the object selection system can utilize an object attribute detection model (e.g., a neural network or metric) to determine which instance of the detected query object to select and provide to the user in the image.

In one or more embodiments, the object selection system detects that the object attribute corresponds to a color. In these embodiments, the object selection system can select and utilize an object color detection model to identify the instance of the detected object query that matches the color specified in the query string. In some embodiments, the object selection system detects that the object attribute corresponds to a position. In these embodiments, the object selection system can select and utilize a position model to identify the instance of the detected object query that matches the specified position. Still in other embodiments, the object selection system can select and utilize another object attribute detection neural network to select the target instance specified in the query string.

In various embodiments, the object selection system facilitates multimodal user input to identify a target instance of the query object. For example, the object selection system utilizes both a query string as well as mouse/touch input to identify a target instance of the query object. In some embodiments, the mouse/touch input provides an indication or selection of the particular object instance requested by the user. In some embodiments, the object selection system can select an object instance in an image based only on mouse/touch input by a user (e.g., without "verbal" user input).

As previously mentioned, the object selection system provides numerous advantages benefits, and practical applications over conventional systems. For example, and as mentioned above, the object selection system performs multiple functions with respect to object detection, isolation, and selection. Indeed, the object selection system can detect a particular object instance in an image requested by a user as well as generate an object mask that selects the particular object instance within the image. Indeed, the object selection system can determine that the user is requesting a target instance of an object within the image and provide the particular requested instance. Accordingly, the object selection system provides increased flexibility and expanded functionality over conventional systems.

Moreover, the object selection system provides increase flexibility by detecting target instances of objects in an image based on multiple user inputs. For example, the object selection system utilizes both query strings (e.g., "verbal" cues) as well as mouse or touch input selections to detect a requested object instance. Indeed, as mentioned above, the object selection system can also select target instances of requested objects based on an object attribute detected in a selection query (e.g., query string).

As a further example, the object selection system provides increased accuracy over conventional systems. For instance, the object selection system improves object detection accuracy by determining an object attribute detection model that best corresponds to a query object attribute from a group of different object attribute detection models. Indeed, by utilizing an object attribute detection model or neural network that is tailored to the query object, the object selection system achieves improved accuracy in object detection as well as object selection.

In addition, the object selection system provides improved accuracy over conventional systems by separating the selection of multiple instances of a detected object rather than providing a single selection that includes all instances of the detected object. Further, the object selection system can detect a user requesting a target instance (e.g., by detecting an object attribute in the query string), isolate the target instance using multiple object detection models, and provide a selection of the target instance of the object requested by the user.

Furthermore, the object selection system provides improved efficiency over conventional systems by utilizing the object selection pipeline. Indeed, unlike closed end-to-end conventional systems, when a fault occurs, the object selection system can pinpoint the faulty component in the object selection pipeline and repair the component. Further, the object selection system can add additional components to improve accuracy. For example, the object selection system can add additional specialist object detection neural networks to the object selection pipeline that correspond to frequently queried objects. Similarly, the object selection system can replace and/or upgrade components within the object selection pipeline with more efficient versions.

Additionally, the object selection system significantly reduces the number of actions that many conventional systems require of users to select an object within an image. Rather than the user using inefficient mouse input-based tools to manually select an object, the user "tells" (e.g., provides verbal cues in a query string) the object selection system which object to select and the object selection system automatically detects and selects the object. Indeed, the object selection system greatly simplifies the object selection process to one or two simple actions by the user.

Additional advantages and benefits of the object selection system will become apparent in view of the following description. Further, as illustrated by the foregoing discussion, the present disclosure utilizes a variety of terms to describe features and advantages of the object selection system. Before describing the object selection system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various embodiments, an image editing system displays an image on a computing device, such as a client device. In additional embodiments, the image editing system enables a user to modify or change an image as well as generate new images. For example, the image editing system enables a user to copy an object selected in a first image over the background of a second image.

The term "object," as used herein, refers to a visual representation of a subject, concept, or sub-concept in an image. In particular, an object refers to a set of pixels in an image that combine to form a visual depiction of an item, article, partial item, component, or element. An object can correspond to a wide range of classes and concepts. For example, objects include specialty objects, conceptual objects, objects from known-classes, and unknown object classes (e.g., objects not used in training any of the object detection neural networks). In some embodiments, an object includes multiple instances of the object. For example, an image of a rose bush includes multiple instances of roses. In one or more embodiments, an object includes sub-objects, parts, or portions. For example, a person's face or leg can be objects that are part of another object (e.g., the person's body). As another example, a shirt is an object that can be part of another object (e.g., a person).

As mentioned above, the object selection system can accurately detect and automatically select an object within an image based on a query string. As used herein, the term "query string" refers to a text string of one or more words that indicates a target object. A query string can include a noun representing a query object. In general, the object selection system receives a query string when a user requests the object selection system to automatically select an object in an image. In some embodiments, the query string is submitted as a text string. In alternative embodiments, the object selection system detects alternative user input, such as voice data, and converts the alternative user input into text to obtain the query string. In various embodiments, a query string is a type of selection query.

As used herein, the term "object mask" or "segmentation mask" or "object segmentation" refers to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

As used herein, the term "approximate boundary" refers to an indication of an area including an object that is larger and/or less accurate than an object mask. In one or more embodiments, an approximate boundary can include at least a portion of a query object and portions of the image not comprising the query object. An approximate boundary can include any shape, such as a square, rectangle, circle, oval, or other outline surrounding an object. In one or more embodiments, an approximate boundary comprises a bounding box.

As just mentioned, a query string can include a query object. The term "query object" refers to the object in the query string that is being requested by the user for detection and selection. For example, the noun in the query string indicates the query object. In additional embodiments, the query string includes additional words, such as adjectives and adverbs that indicate attributes of the query object. As used herein, the term "object attribute" refer to a descriptive word further identifying the query object. Examples of object attributes include color, size, length, shape, position, location, pattern, composition, expression, emotion, rigidity, and/or flexibility.

The term "object selection pipeline" refers to a collection of components and actions utilized to detect and select a query object in an image. In various embodiments, the object selection system utilizes a subset of the components and actions in the object selection pipeline to detect and select a query object in an image, where output from one component is provided as input to another component. The components and actions can include neural networks, machine-learning models, heuristic models, and/or functions. Further, the components and actions in the object selection pipeline can be interchangeable, removable, replaceable, or upgradable, as described in further detail below.

As used herein, the term "object attribute detection model" refers to one or more methods, algorithms, actions, and/or steps for detecting an instance of an object. In some embodiments, an object attribute detection model can utilize machine-learning techniques, as described below in connection with FIG. 14. In one or more embodiments, the object attribute detection models does not utilize machine-learning techniques. For instance, the object attribute detection model utilizes non-machine-learning heuristics. Examples of object attribute detection models are provided below in connection with FIGS. 10-13.

As mentioned above, the object selection system can employ machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, an object detection neural network, an object proposal neural network, an unknown object class detection neural network, a region proposal neural network, a concept embedding neural network, an object mask neural network, an object classification neural network, and/or an object attribute detection neural network), data-based models (e.g., a natural language processing model, an object recognition model, a filtering model, and/or an object attribute detection model), or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), Region-CNN (R-CNN), Faster R-CNN, Mask R-CNN, and single shot detect (SSD).

Referring now to the figures, FIG. 1 illustrates a schematic diagram of an environment 100 in which the object selection system 106 can operate in accordance with one or more embodiments. As shown in FIG. 1, the environment 100 includes a client device 102 and a server device 110 connected via a network 108. Additional detail regarding computing devices (e.g., the client device 102 and the server device 110) is provided below in connection with FIG. 18. In addition, FIG. 18 also provides additional detail regarding networks, such as the illustrated network 108.

Although FIG. 1 illustrates a particular number, type, and arrangement of components within the environment 100, various additional environment configurations are possible. For example, the environment 100 can include any number of client devices. As another example, the server device 110 can represent a set of connected server devices. As a further example, the client device 102 may communicate directly with the server device 110, bypassing the network 108 or utilizing a separate and/or additional network.

As shown, the environment 100 includes the client device 102. In various embodiments, the client device 102 is associated with a user (e.g., a user client device), such as the user that requests automatic selection of an object in an image. The client device 102 can include an image editing system 104 and an object selection system 106. In various embodiments, the image editing system 104 implements the object selection system 106. In alternative embodiments, the object selection system 106 is separate from the image editing system 104. While the image editing system 104 and the object selection system 106 is shown on the client device 102, in some embodiments, the image editing system 104 and the object selection system 106 are located remotely from the client device 102 (e.g., on the server device 110), as further explained below.

The image editing system 104, in general, facilitates the creation, modification, sharing, and/or deletion of digital images within applications. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more embodiments, the image editing system 104 operates in connection with digital design applications such as ADOBE® PHOTOSHOP®, ADOBE® ELEMENTS®, ADOBE® INDESIGN®, or other image editing applications.

In some embodiments, the image editing system 104 provides an intelligent image editing assistant that performs one or more automatic image editing operations for the user. For example, given an image of three men, a user requests that the image editing system "remove the tallest man." As part of fulfilling the request, the image editing system 104 utilizes the object selection system 106 to automatically select the tallest man. The image editing system 104 can then utilize additional system components (e.g., a hole filling neural network) to remove and replace the selected tallest man (e.g., the detected query object).

As mentioned above, the image editing system 104 includes the object selection system 106. As described in detail below, the object selection system 106 accurately detects and automatically selects objects in an image based on a user's request (e.g., a user-provided query string). The object selection system 106, in many embodiments, utilizes an object selection pipeline to determine which object detection neural networks to utilized based on the query object as well as which additional neural networks and/or models to utilize to select the particular requested query object.

As shown, the environment 100 also includes the server device 110. The server device 110 includes an object selection server system 112. For example, in one or more embodiments, the object selection server system 112 represents and/or provides similar functionality as described herein in connection with the object selection system. In some embodiments, the object selection server system 112 supports the object selection system 106 on the client device 102.

Indeed, in one or more embodiments, the server device 110 can include all, or a portion of, the object selection system 106. In particular, the object selection system 106 on the client device 102 can download an application from the server device 110 (e.g., an image editing application from the object selection server system 112) or a portion of a software application.

In some embodiments, the object selection server system 112 can include a web hosting application that allows the client device 102 to interact with content and services hosted on the server device 110. To illustrate, in one or more embodiments, the client device 102 accesses a web page supported by the server device 110 that automatically selects objects in images based on the user providing a query string via the client device 102. As another example, the client device 102 provides an image editing application that provides the image and the query string to the object selection server system 112 on the server device 110, which then detects a query object instance and provides an object mask of the detected query object instance back to the client device 102. Then, utilizing the object mask, the image editing application on the client device 102 selects the detected query object instance.

Figure 2:
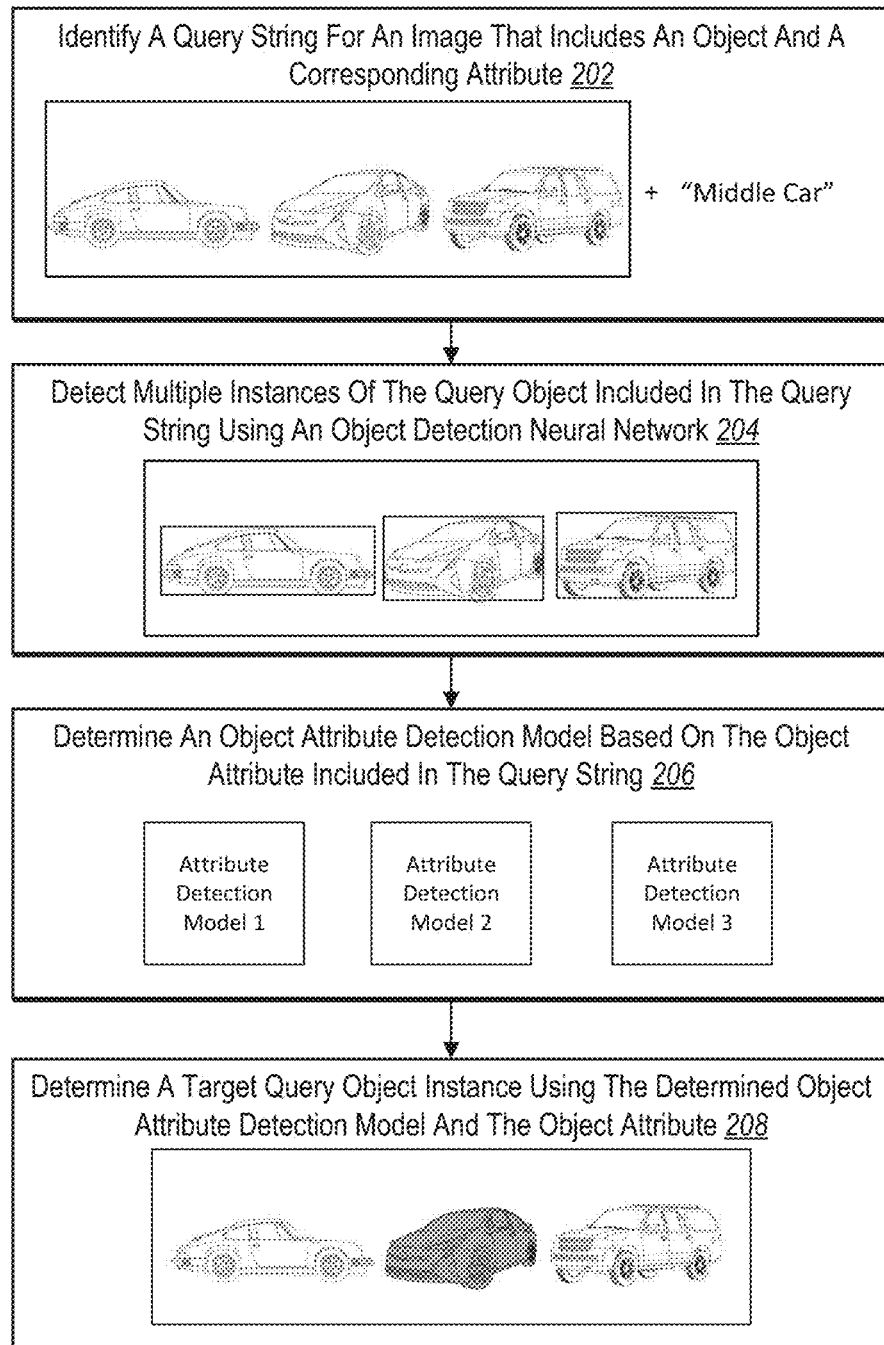
FIG. 2 illustrates a schematic diagram of automatically detecting and selecting a target query object instance in an image in accordance with one or more embodiments.

As mentioned above, FIG. 1 shows an example environment 100 in which the object selection system 106 can operate. Turning to the next figure, FIG. 2 provides an overview of utilizing the object selection system to automatically select object instances in an image. In particular, FIG. 2 illustrates a series of acts 200 illustrates a schematic diagram of automatically detecting and selecting a target query object instance in an image in accordance with one or more embodiments. In various embodiments, the object selection system 106 performs the series of acts 200.

As shown in FIG. 2, the series of acts 200 includes the act 202 of the object selection system 106 identifying a query string that indicates a target object in an image. For example, a user utilizes an image editing program to edit an image. While editing the image, the user desires to select a particular object within the image. Accordingly, the object selection system 106 provides the user with a graphical interface that enables the user to enter a query string (i.e., selection query) requesting automatic selection of the object. As shown in FIG. 2 in connection with the act 202, the user provides the query string of "middle car" to be selected from the image of three cars.

In one or more embodiments, as part of the act 202, the object selection system 106 can utilizes natural language processing to identify a query object from the query string. For example, the object selection system 106 determines that the query string includes the query object of "car." In additional embodiments, the object selection system 106 can determine one or more object attributes from the query string that corresponds to the query object. For instance, the object selection system 106 determines that the query string includes the object attribute of "middle."

In response to receiving a query string, the object selection system 106 performs the act 204 of determining multiple instances of the query object included in the selection query utilizing an object detection neural network. For example, the object selection system 106 utilizes one or more object detection neural networks to detect each instance or occurrence of the query object within the image. Indeed, when multiple instances of the query object are included in the image, the object selection system 106 can detect each of the multiple instances. As illustrated, the act 206 shows the object detection neural network detecting each of the three cars in the image.

As shown, the series of acts 200 includes the act 206 of the object selection system 106 determining an object attribute detection model based on the object attribute included in the query string. In particular, when an object attribute is detected, the object selection system 106 can analyze the object attribute to determine an object attribute detection model that corresponds to the object attribute. As mentioned above, based on analyzing the object attribute, the object selection system 106 can determine to utilize a specialized object attribute detection model corresponding to color, size, length, shape, position, location, pattern, composition, expression, emotion, rigidity, and/or flexibility. In some embodiments, the object selection system 106 determines to select a generalized (i.e., non-specialized) object attribute detection neural network, as described further below.

In the act 208, the object selection system 106 can determine a target query object instance is the target query object using the determined object attribute detection model and the object attribute. To illustrate, as shown in connection with the act 208, the object selection system 106 selects the middle car based on the object attribute of "middle." In various embodiments, the object selection system 106 utilizes an object position detection model to detect the middle car from the other detected cars in the image.

Upon selecting the target instance of the query object that satisfies the object attribute in the query string, the object selection system 106 can provide the target query object instance to the user. For example, the object selection system 106 can automatically select the target query object instance within the image. In other words, the object selection system 106 can generate and provide an object mask of the middle car as shown. In some embodiments, the object selection system 106 automatically selects the target query object instance within an image editing application in response to the selection query.

In some embodiments, the object selection system 106 can detect multiple target instances of the query object. In particular, if more than one of the multiple query object instances of the query object satisfies the object attribute in the query string, the object selection system 106 can automatically select those query object instances as target query object instances. To illustrate, if an image depicts a parking lot of cars and the query string is "red car," the object selection system 106 can automatically detect and select all of the red cars.

In various embodiments, the query string includes more than one object attribute. In these embodiments, the object selection system 106 can determine multiple object attribute detection models that correspond to the multiple object attributes (e.g., repeat the act 206). Further, the object selection system 106 can utilize each of the multiple object attribute detection models to identify a target query object instance that satisfies each of the multiple object attributes (e.g., repeat the act 208). To illustrate, for the query string of "top, red ball," the object selection system 106 can utilize a color detection model to find one or more red balls and a position detection model to find the highest positioned ball(s). Then, the object selection system 106 identifies the one or more instances of detected balls that are both red and the highest positioned.

Figure 3A:
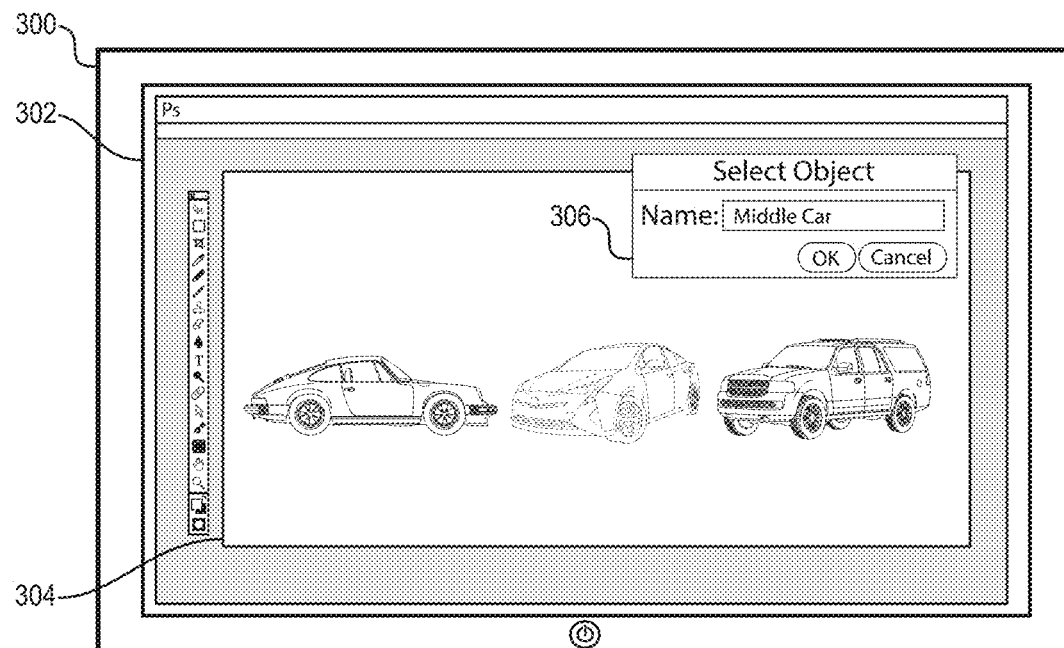
FIGS. 3A-3B illustrate a graphical user interface workflow of automatically detecting and selecting a query object in an image in accordance with one or more embodiments.
Figure 3B:
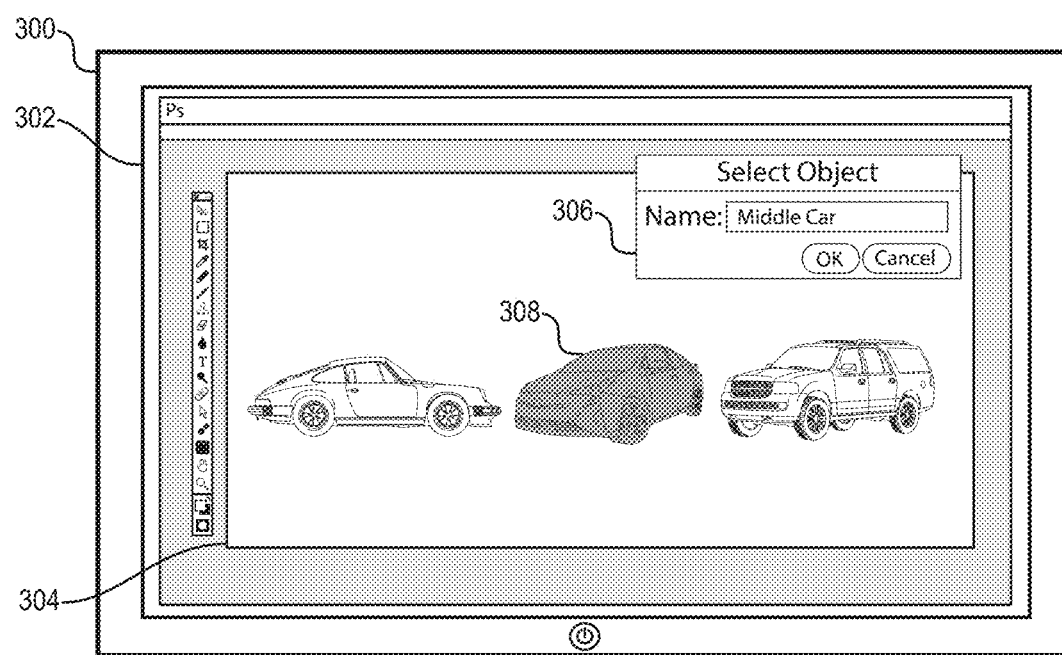

FIGS. 3A-3B illustrate a client device 300 having a graphical user interface 302 that illustrates a selected query object instance in an image based on a selection request in accordance with one or more embodiments. The client device 300 in FIGS. 3A-3B can represent the client device 102 introduced above with respect to FIG. 1. For instance, the client device 300 includes an image editing application that implements the image editing system 104 having the object selection system 106. For example, the graphical user interface 302 in FIGS. 3A-3B can be generated by the image editing application.

As shown in FIG. 3A, the graphical user interface 302 includes an image 304 within an image editing application. The image 304 can correspond to the image mentioned above in connection with FIG. 2. For ease in explanation, the image 304 is simplified to show three cars without background or other objects.

In response to a user selecting an option to have an object automatically selected, the object selection system 106 can provide an object selection request interface 306. For example, the object selection system 106 provides the object selection request interface 306 as a selection tool within the image editing application. As shown, the object selection request interface 306 can include a text field where a user can enter a query string (i.e., "Middle Car"). The object selection request interface 306 also include selectable options to confirm or cancel a selection request. In some embodiments, the object selection request interface 306 includes additional elements, such as a selectable option to capture audio input from a user dictating the query string.

Based on receiving a selection request that includes a query string (i.e., "middle car"), the object selection system 106 can accurately detect and automatically select the query object. In particular, the object selection system 106 can detect each instance of the query object (e.g., each of the three cars) in the image 304 as well as identify the particular or target instance specified in the query string (e.g., the "middle" car). To illustrate, FIG. 3B shows the result of the object selection system 106 detecting and selecting the middle car 308 within the image 304 in response to the selection request. Once selected, the image editing application can enable the user to edit, copy, cut, move and/or otherwise modify the selected object.

As shown, the object selection system 106 enables the user to provide a query string within the object selection request interface 306. In some embodiments, the object selection system 106 enables a user to provide the audio or other input to indicate a query string. For example, the client device 300 can include a microphone that captures the user speaking the query string and speech-to-text processing to convert the query string to text. Moreover, as described below, in some embodiments, the object selection system 106 enables the user to provide additional input, such as a mouse or touch gesture to further assist the object selection system 106 to automatically select a target query object.

Figure 4:
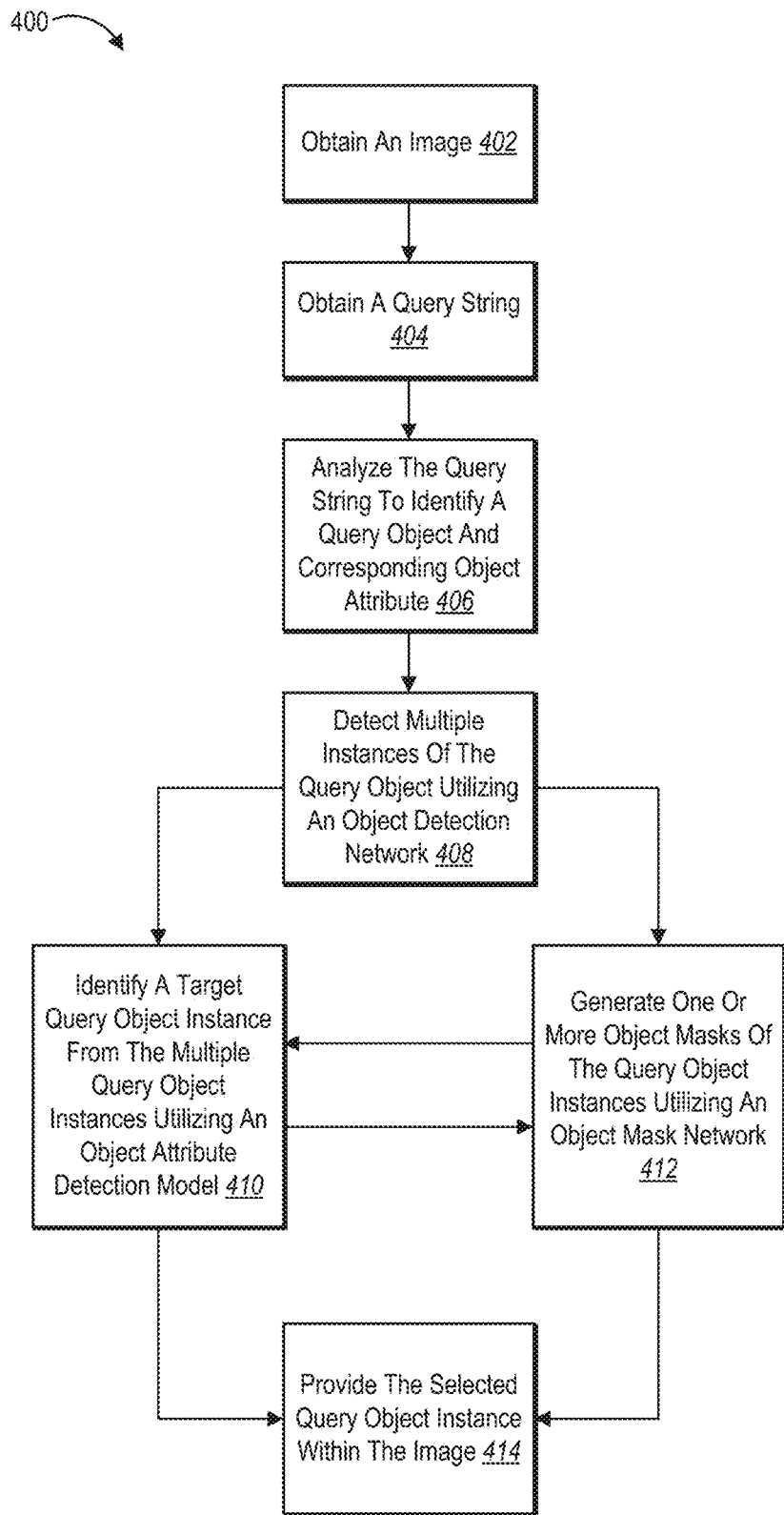
FIG. 4 illustrates a schematic diagram of an object selection pipeline for selecting a target query object in an image in accordance with one or more embodiments.

Turning now to FIGS. 4-15, additional detail is provided regarding the object selection system 106 utilizing an object selection pipeline to automatically select and accurately detect objects requested in a selection request. In particular, FIG. 4 illustrates an example embodiment of the object selection pipeline. FIGS. 5-15 illustrate expanded portions of the object selection pipeline for selecting target instances of a detected query object along with corresponding graphical user interfaces.

As mentioned, FIG. 4 illustrates a schematic diagram of an object selection pipeline 400 in accordance with one or more embodiments. In various embodiments, the object selection system 106 performs actions included in the object selection pipeline 400. In alternative embodiments, an image editing system and/or image editing application can perform one or more of the included actions.

As shown, the object selection pipeline 400 includes an act 402 of the object selection system 106 obtaining an image (i.e., a digital image). For example, the object selection system 106 can detect the user selecting an image to be loaded into an image editing application, as previously described. In general, the image includes one or more objects. For instance, the image can include objects of various types and classes.

In addition, the object selection pipeline includes an act 404 of the object selection system 106 obtaining a query string. For example, the object selection system 106 provides an object selection request interface (e.g., shown in FIG. 3A) where a user can enter one or more words indicating the object that they would like the object selection system to automatically select. As described above, in some embodiments, the object selection system 106 can enable additional or alternative forms of user input, such as audio input or touch input.

Next, the object selection pipeline 400 includes an act 406 of the object selection system 106 analyzing the query string to identify a query object and corresponding object attribute. As mentioned above, a query string often includes object attributes for a query object when multiple instances of the query object are included in the image. In this manner, the object attribute indicates which target instance of the multiple query object instances that the user is requesting be automatically selected. In addition, the object selection system 106 can parse the query string and utilize natural language processing to identify a query object. Additional detail regarding the act 406 is provided with respect to FIG. 5 below.

As shown, the object selection pipeline 400 includes the act 408 of the object selection system 106 detecting multiple instances of the query object utilizing an object detection network. As used herein, the object detection network can correspond to one or more types of object detection neural networks that the object selection system 106 utilizes to select a query object and/or multiple query object instances in an image. Additional detail regarding the act 408 is provided below with respect to FIGS. 6-7C.

As part of the act 408, the object selection system 106 can create an approximate boundary around each query object instances of the detected query object. In some embodiments, the object selection system 106 can generates bounding boxes around each of the multiple query object instances. In some cases, bounding boxes can provide a group or subset of pixels within the image that includes the corresponding query object instance.

As shown in FIG. 4, the object selection pipeline 400 includes the act 410 of identifying a target instance of the detected query object from the multiple query object instances utilizing an object attribute detection model. For example, the object selection system 106 can determine and select an object attribute detection model that corresponds to the object attribute indicated in the query string. The object selection system 106 can then use the object attribute detection model to detect that the target query object instance includes the object attribute from the query string or that the other query object instances lack the object attribute. In particular, the object selection system 106 can then use the object attribute detection model to analyze the bounding boxes corresponding to the detected multiple instance of the query object to determine if they include the object attribute. In one or more embodiments, the object selection system 106 can generate object masks of each instance of the multiple query objects and then use the objects masks corresponding to each query object instance to determine if the given query object instance is the target query object (i.e., has the object attribute).

As also shown, the object selection pipeline 400 includes the act 412 of the object selection system 106 generating one or more object masks of the query object instances utilizing an object mask neural network. For example, in various embodiments, the object selection system 106 can provide a bounding box corresponding to the identified target query object instance to an object mask neural network, which generates a mask for the detected target query object. If multiple bounding boxes are provided, the object selection system 106 can utilize the object mask neural network to generate multiple object masks from the multiple bounding boxes (e.g., one object mask for each instance of the detected target query object).

In generating an object mask for the target query object, the object mask neural network can segment the pixels in the detected query object from the other pixels in the image. For example, the object mask neural network can create a separate image layer that sets the pixels corresponding to the query object instance to positive (e.g., binary 1) while setting the remaining pixels in the image to a neutral or negative (e.g., binary 0). When this object mask layer is combined with the image, only the pixels of the query object instance are visible. Indeed, the generated object mask can provide a segmentation that enables selection of the query object instance within the image.

The object mask neural network can correspond to one or more deep neural networks or models that select an object based on bounding box parameters corresponding to the object within an image. For example, in one or more embodiments, the object mask neural network utilizes the techniques and approaches found in Ning Xu et al., "Deep GrabCut for Object Selection," published Jul. 14, 2017, the entirety of which is incorporated herein by reference. For example, the object mask neural network can utilize a deep grad cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

Further, with respect to embodiments where the object mask neural network performs instance level segmentation (e.g., semantic segmentation), the object mask neural network can utilize the techniques and approaches found in U.S. Patent Application Publication No. 2018/0108137, "Instance-Level Semantic Segmentation System," filed on Oct. 18, 2016. Additionally, or alternatively, the object mask neural network can utilize the techniques and approaches found in U.S. Pat. No. 9,129,191, "Semantic Object Selection," issued on Sep. 8, 2015, each of which are incorporated herein by reference in their entirety.

As shown in the object selection pipeline 400 of FIG. 4, the object selection system 106 can advance from the act 408 to either the act 410 or the act 412. In particular, depending on which object attribute detection model the object selection system 106 selects, the object selection system 106 can determine when to generate one or more object masks. To elaborate, in a number of embodiments, the object selection system 106 utilizes an object attribute detection model that can detect the target query object instance using the approximate boundaries (e.g., bounding boxes) of the multiple query object instances. In these embodiments, the object selection system 106 can advance from the act 408 to the act 410 to first detect the target query object instance. Then, the object selection system 106 can advance to the act 412 to generate an object mask for only the target query object instance without generating additional object masks for other query object instances of the multiple query object instances. In these embodiments, the object selection system 106 prevents processing resources being wasted in generating object masks for query object instances of the detected query object that the user does not want selected.

In alternative embodiments, the object selection system 106 can determine to utilize an object attribute detection model that detects the target query object instance using separate object masks for each of the multiple query object instances. For example, an approximate boundary surrounding a query object instance includes additional pixels not belonging to the query object instance and these additional pixels can negatively impact the accuracy of the query object instance detection process. Accordingly, in these embodiments, the object selection system 106 can advance from the act 408 to the act 412 to first generate object masks for each of the multiple query object instances. Then, the object selection system 106 can advance to the act 410 to detect the target query object instance utilizing the selected object attribute detection model based on only pixels belonging to each query object instance. Additional detail regarding determining an object attribute detection model and identifying the target query object instance is provided below in connection with FIGS. 8-15.

Moreover, the object selection pipeline 400 includes the act 414 of the object selection system 106 providing the selected query object instance within the image to the user. For example, the object selection system 106 can provide the selected target instance of the query object (or multiple query object instances) to the client device associated with the user. In some cases, the object selection system 106 can automatically select the target query object instance within the image for the user within the image editing application mentioned above.

In various embodiments, many of the components of the object selection pipeline 400 are interchangeable with updated versions as well as new components. Accordingly, when faults occur, the object selection system 106 can identify and update the source of the fault. In addition, the object selection system 106 can also add further components to the object selection pipeline to improve the performance of the detected objects in images.

More particularly, upon detecting the location of the fault within the object selection pipeline 400, the object selection system 106 can upgrade or replace the faulty component. For example, the object selection system 106 can replace the faulty component with an improved version. Similarly, the object selection system 106 can substitute older components with new components with newer versions as the newer versions become available. Further, the object selection system 106 can upgrade and/or replace components without needing to change, retrain, reconfigure, and/or modify other components of the object selection pipeline. Additionally, the object selection system 106 can continue to utilize the object selection pipeline until another fault is detected.

Figure 5:
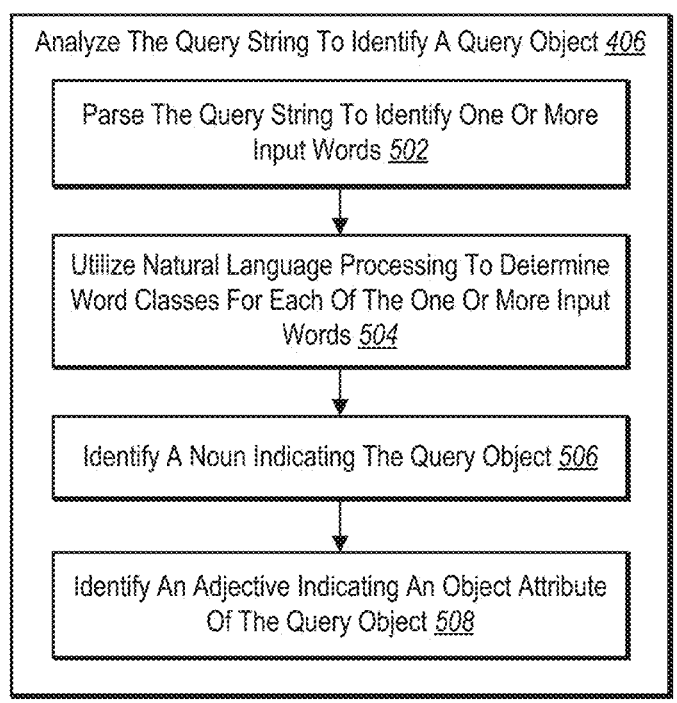
FIG. 5 illustrates a flow chart of analyzing a user selection query to identify a query object in accordance with one or more embodiments.

Turning now to the next figure, FIG. 5 illustrates a flow chart of analyzing a query string to identify a query object in accordance with one or more embodiments. As mentioned above, FIG. 5 corresponds to the act 406 of the object selection pipeline 400 described above in connection with FIG. 4. In particular, FIG. 5 includes various acts 502-508 that provide additional detail regarding the act 406 of the object selection pipeline 400.

As shown, the act 406 can include the act 502 of the object selection system 106 parsing the query string to identify one or more input words. For example, in various embodiments, the object selection system 106 separates the query string into individual words. For instance, the object selection system 106 assigns each word in the query string to an element of a vector that corresponds to the query string. Also, as mentioned above, in some embodiments, the query string is made up of a single word.

As also shown, the act 406 can include the act 504 of the object selection system 106 utilizing natural language processing to determine word classes for each of the one or more input words. Indeed, upon parsing out each word in the query string, the object selection system 106 can classify and assign each input word in the query string to a word classes. In various embodiments, word classes include parts of speech (e.g., nouns, proper nouns, verbs, articles, adjectives, adverbs, pronouns, prepositions, or conjunctions).

In one or more embodiments, the object selection system 106 utilizes a machine-learning model trained based on natural language processing to identify the word class of each word in the query string. For example, the object selection system 106 trains and/or utilizes a long-short-term memory (LSTM) neural network to identify the word class for each of the words in the query string. In alternative embodiments, the object selection system 106 utilizes other methods to determine the word class for input words in the query string.

As shown, the act 406 can include the act 506 of the object selection system 106 identifying a noun indicating the query object. More specifically, upon assigning word classes for each of the words, the object selection system 106 can identify a noun in the query string. Primarily, the noun in the query string corresponds to the query object. Often, when the query string includes a single word, the word is a noun corresponding to the query object.

In some instances, the query string includes multiple nouns. In these instances, the object selection system 106 can determine if the two nouns are connected to indicate a single query object (e.g., "German" and "Shepard"). In alternative embodiments, the object selection system 106 can determine whether the query string includes multiple query objects for the object selection system 106 to automatically select.

In addition, the act 406 can include the act 508 of the object selection system 106 identifying an adjective indicating an object attribute of the query object. Similar to identifying a noun in the query string, the object selection system 106 can also identify adjectives in the query string as object attributes. Often, a query string with multiple words will include a query object along with one or more adjectives that specify a particular attribute of the query object. As described below, an object attribute can specify a color, size, position, shape, material, location, rigidity, or expression of the query object.

In one or more embodiments, the object selection system 106 also can identify an adverb or other part of speech (i.e., word class) in the query string. In some embodiments, the object selection system 106 can assign the adverb an as object attribute of the query object. Further, in one or more embodiments, the object selection system 106 can group the adverb with a corresponding adjective (e.g., "very tall"). In alternative embodiments, the object selection system 106 can ignore words that are not nouns or adjectives.

Similarly, in one or more embodiments, the object selection system 106 can filter out words of the query string, such as articles (e.g., "the," "a," "an"). In some embodiments, the object selection system 106 can identify conjunctions, which indicate the possibility of multiple query objects being requests and/or multiple object attributes being provided. Similarly, in some embodiments, the object selection system 106 identifies negative words, such as the "not," "except," or "without," which can indicate exclusion of a particular object when selecting the query object.

Figure 6:
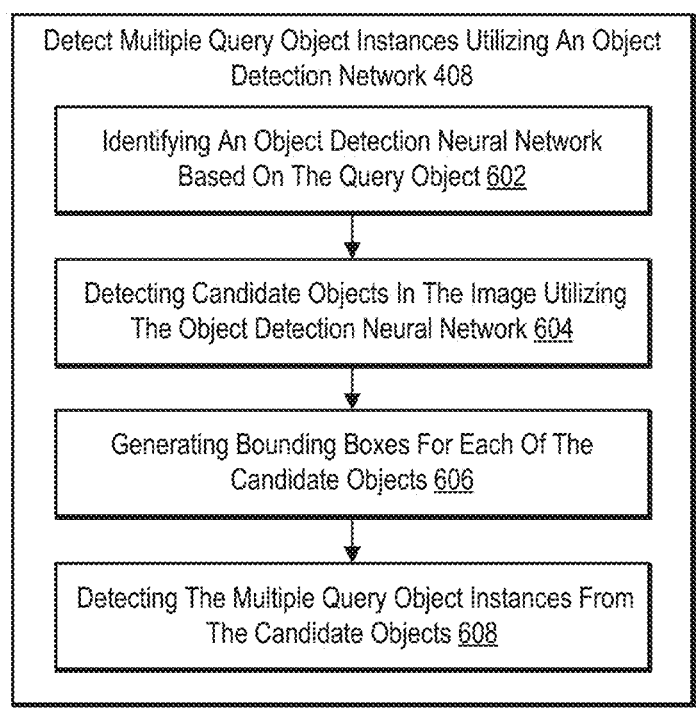
FIG. 6 illustrates a flow chart of detecting multiple query object instances in an image utilizing an object detection network in accordance with one or more embodiments.

Turning to FIG. 6, a flow chart of detecting multiple query object instances in an image utilizing an object detection network in accordance with one or more embodiments. As described above, FIG. 6 corresponds to the act 408 of the object selection system 106 detecting multiple instances of the query object utilizing an object detection network. As also described above, the object selection system 106 arrives at the act 408 based on identifying a query object within a query string of a selection query, where the selection query corresponds to an image. In particular, FIG. 6 includes various acts 602-610 that provide additional detail regarding the act 408 of the object selection pipeline 400.

As shown, the act 408 includes the act 602 of the object selection system 106 identifying an object detection neural network based on the query object. In some embodiments, the object selection system 106 utilizes a generalized object detection neural network to detect multiple instances of the query object in an image. In alternative embodiments, the object selection system 106 determines to utilize a more specific specialized object detection neural network. Indeed, object detection neural networks can be trained specifically to detect particular object types or object classes.

To illustrate, examples of object detection neural networks include a specialist object detection neural network (e.g., a sky detection neural network, a face detection neural network, a body detection neural network, a skin detection neural network, a waterfall detection neural network), an object-based concept detection neural networks, a known object class detection neural networks, an unknown object class detection neural networks. Examples of object detection neural networks can also include sub-networks and/or supportive object detection network, such as an object proposal neural network, a regional proposal neural network, and a concept embedding neural networks. Additional description regarding object detection neural networks is provided in U.S. patent application Ser. No. 16/518,810, "AUTOMATICALLY DETECTING USER-REQUESTED OBJECTS IN IMAGES," filed Jul. 22, 2019, the entirety of which is incorporated herein by reference.

As shown in FIG. 6, the act 408 can include the act 604 of the object selection system 106 detecting candidate objects in the image utilizing the object detection neural network. In one or more embodiments, the object selection system 106 detects multiple candidate objects in the image using the object detection neural network, where at least some of candidate objects match the query object. In alternative embodiments, each of the candidate objects can match to the query object.

In addition, the act 408 can include the act 606 of the object selection system 106 generating bounding boxes for each of the candidate objects. For example, as part of detecting the candidate objects, the object detection neural network creates an approximate boundary around each detected candidate object. In some embodiments, the object detection neural network can process sub-sections or patches of the image to identify smaller candidate objects within the image that could not be detected with whole image object detection methods. Accordingly, the object detection neural network can generate multiple bounding boxes that each indicate a candidate object in the image that could potentially be the query object.

As shown, the act 408 can include the act 608 of the object selection system 106 detecting the multiple query object instances from the candidate objects. In some embodiments, the object detection neural network generates labels for each of the bounding boxes and correlates the labels to the query object. In other embodiments, the object detection neural network further processes each candidate object to determine whether it corresponds to the query object. The object detection neural network can utilize a variety of techniques to identify the multiple query object instances from the candidate objects, as described in U.S. patent application Ser. No. 16/518,810, which is referenced above.

Figure 7A:
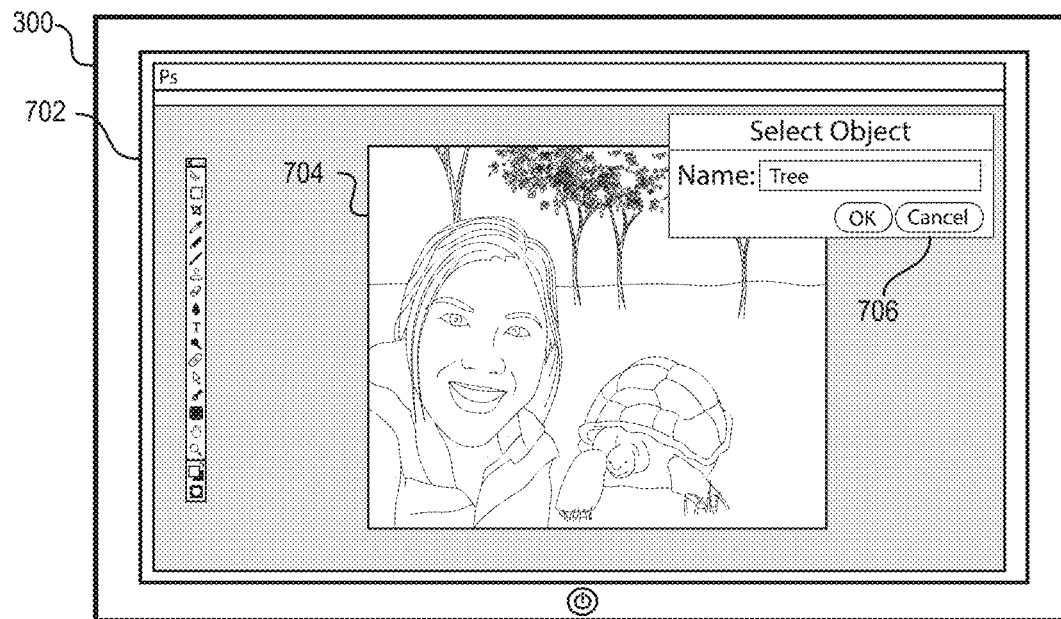
FIGS. 7A-7C illustrate a graphical user interface workflow of utilizing an object detection network to detect multiple query object instances in an image in accordance with one or more embodiments.
Figure 7B:
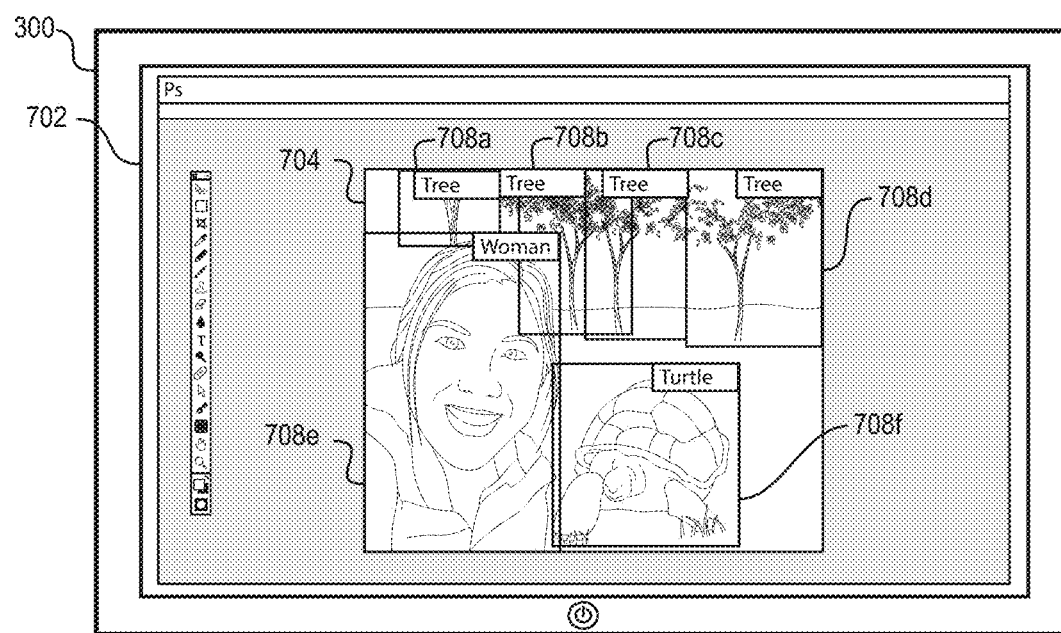
Figure 7C:
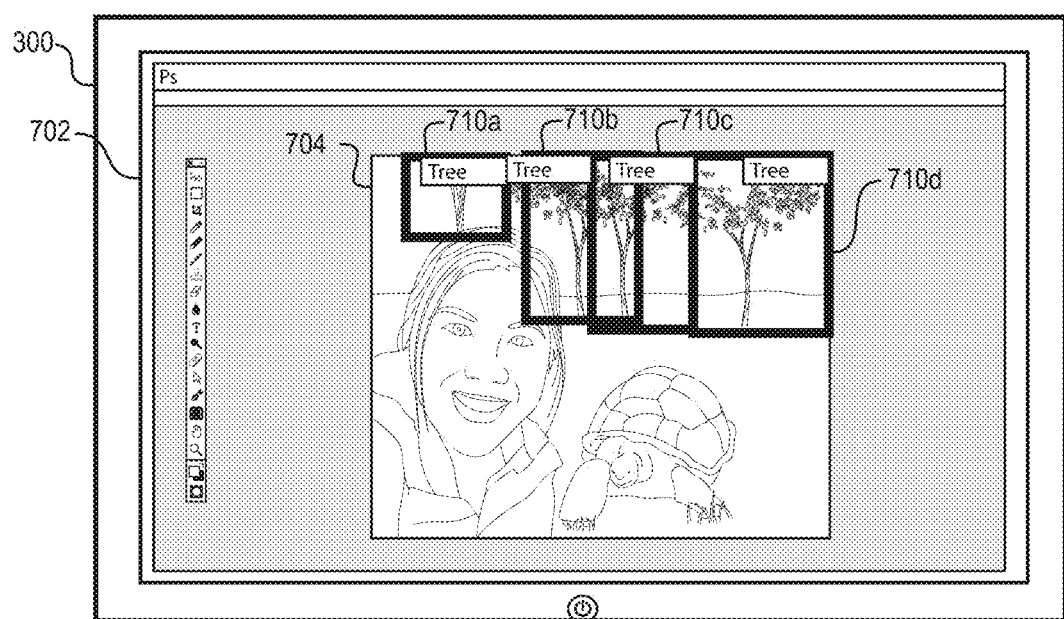

FIGS. 7A-7C illustrate a graphical user interface 702 that illustrates the object selection system 106 utilizing a known object class detection neural network to detect the query object in accordance with one or more embodiments. For ease in explanation, FIGS. 7A-7C include the client device 300 introduced above. For example, the client device 300 includes an image editing application that implements the image editing system 104 that utilizes the object selection system 106.

As shown in FIG. 7A, the graphical user interface 702 includes an image 704 within an image editing application. The image 704 shows a woman with a tortoise in front of a row of trees. As also shown, the image editing application includes various tools (e.g., a vertical toolbar) having selection options as well as other image editing options. In addition, the graphical user interface 702 includes an object selection interface 706, as described above in connection with FIG. 3A, where the user provides the query object of "tree."

As explained previously, upon the user providing the query string, the object selection system 106 can first identify the query object within a query string as "tree." In addition, the object detection neural network can determine and utilize an object detection neural network to automatically detect one or more instances of the query object in response to the selection query. For example, if "tree" is a known object, the object selection system 106 can utilize a known object class detection neural network to detect any instances of trees (i.e., the query object) within the image.

To illustrate, FIG. 7B shows the object selection system 106 can utilize an object detection neural network to identify candidate objects 708a-708f within the image 704. As part of detecting the candidate objects 708a-708f, the object selection system 106 generates bounding boxes around the objects as well as tags each of the bounding boxes with labels. As shown, the object selection system 106 detects the candidate objects of trees 708a-708d, a woman 708e, and a tortoise 708f.

As described above, the object selection system 106 can determine which of the candidate objects 708a-708f correspond to the query object of "tree." For example, the object selection system 106 determines that the trees 708a-708d correspond to the query object while the woman 708e and the tortoise 708f do not correspond the query object. Further, the object selection system 106 can determine that the image 704 includes multiple query object instances of the detected trees.

To illustrate, FIG. 7C shows the object selection system 106 detecting the multiple query object instances 710a-710d of the trees. In additional embodiments, as described below in detail, if the query string includes an object attribute corresponding to the query object, the object selection system 106 can further detect a target query object instance from the multiple query object instances 710a-710d.

While not shown, in some embodiments, the object selection system 106 can select the multiple query object instances 710a-710d and provide them to the user in response to the selection query. Indeed, the object selection system 106 can provide the bounding boxes for the multiple query object instances 710a-710d to the object mask neural network described above. Further, the object selection system 106 can utilize separately generated objects masks to individually select the trees for the user within the image editing application, as described above.

As a note, FIGS. 7B and 7C show the object selection system 106 utilizing an object detection neural network to detecting the multiple query object instances 710a-710d. In many embodiments, the object selection system 106 does not display these illustrated actions to the user. Rather, the object selection system 106 appears to automatically detect and accurately select the multiple query object instances 710a-710d in response to the user's selection query. In alternative embodiments, the object selection system 106 displays one or more of these actions to the user. For example, the object selection system 106 displays the bounding boxes of the multiple query object instances 710a-710d, as shown in FIG. 7C.

Figure 8:
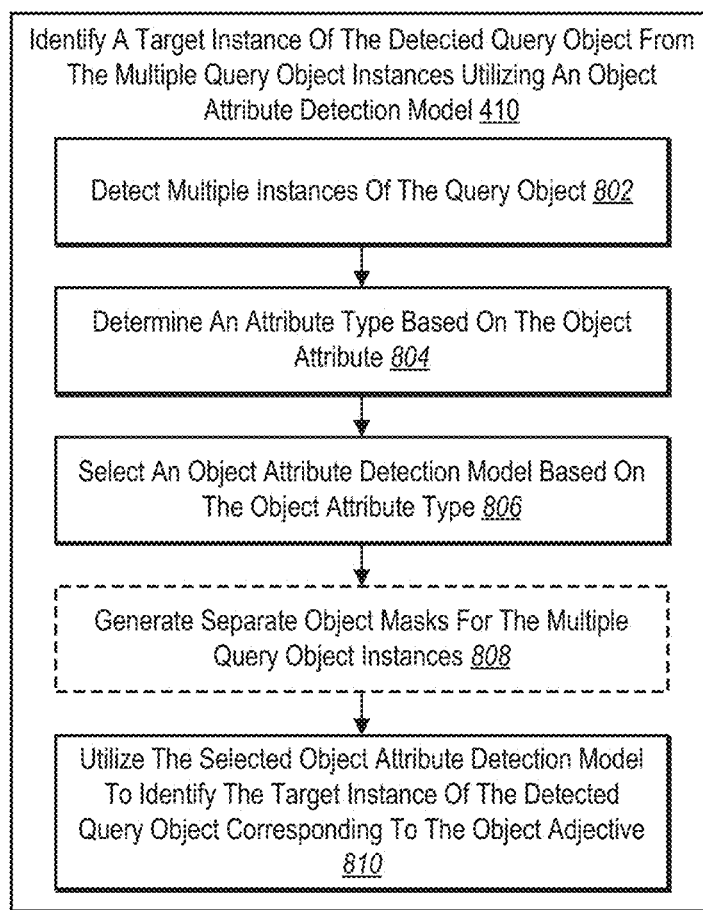
FIG. 8 illustrates a flow chart of detecting a target instance of a query object in accordance with one or more embodiments.

Turning to FIG. 8, a flow chart of detecting a target instance of a query object is illustrated in accordance with one or more embodiments. As mentioned above, FIG. 8 corresponds to the act 410 of identifying a target instance of the detected query object from the multiple query object instances utilizing an object attribute detection model included in the object selection pipeline 400, as described above in connection with FIG. 4. In particular, FIG. 8 includes various acts 802-810 that provide additional detail regarding the act 410 of the object selection pipeline 400.

As described above, in a number of embodiments, the object selection system 106 can detect more than one instance of a query object in an image. As provided in the above example, if the object selection system 106 detects the query object of "tree" in an image of a landscape, the object selection system 106 can detect multiple trees. In many embodiments, the object selection system 106 can generate and provide individual selections of each instance of the detected query object. In alternative embodiments, the object selection system 106 can generate a single aggregated selection of multiple instances of the detected query object within the image editing application.

In one or more embodiments, the object selection system 106 can identify and select one or more of the instances of the detected query object. In particular, the object selection system 106 can select one or more target query object instances based on the object attribute indicated in the query string. To illustrate, the acts 802-810 of the act 410 in FIG. 8 further describe embodiments of the object selection system 106 selecting a target instance of a detected query object from multiple query object instances of a detected query object.

As shown, the act 410 can include the act 802 of the object selection system 106 identifying multiple instances of the query object. As described above, the object selection system 106 can detect more than one instance of a query object in an image. For example, the object selection system 106 detects multiple instances of dogs, mountains, roads, cars, signs, or people within various images.

In one or more embodiments, the object selection system 106 can identify an adjective indicating an attribute of the query object (i.e., an object attribute). As explained earlier in connection with FIG. 5, in one or more embodiments, the object selection system 106 can identify one or more adjectives in the query string as object attributes. Often, a query string with multiple words will include a query object along with one or more adjectives that specify particular attributes of the query object.

As shown, the act 410 can include the act 804 of the object selection system 106 determining an attribute type based on the object attribute. For example, as mentioned above, an object attribute can specify a color, size, length, position, shape, pattern, material, location, depth, rigidity, prominence, body posture, or facial expression of the query object. Accordingly, the object selection system 106 can analyze each object attribute to determine if it corresponds to a known or unknown object attribute type.

In one or more embodiments, the object selection system 106 can perform a table lookup to determine if the object attribute corresponds to a particular object attribute type. For example, the lookup table can include a listing of colors by names and indicates that these object attributes are associated with colors. In addition, the object selection system 106 can include similar entries for other object attribute types, such as, shape, material, and position. In alternative embodiments, the object selection system 106 trains an object attribute type neural network to predict the object attribute type of an object attribute.

As shown, the act 410 can include the act 806 of the object selection system 106 selecting an object attribute detection model based on the object attribute type. In various embodiments, the object selection system 106 maintains a number of object attribute models corresponding to the various object attribute types. Accordingly, upon detecting a particular object attribute type, the object selection system 106 can select the corresponding object attribute model that will accurately process the object attribute in the query string to select the correct instance of the detected query object.

To illustrate, if the object attribute type is a color, the object selection system 106 can select an object color detection model to identify and select the color provided in the query string (i.e., the object attribute). Similarly, if the object attribute type is a position, the object selection system 106 can select an object position detection model to identify and select the instance of the detected query object having the position indicated in the query string. Additionally, the object selection system 106 can select additional specialized and/or generalized object attribute detection models based on the object attribute type.

As shown, the act 410 can include the optional act 808 of the object selection system 106 generating separate object masks for the multiple query object instances. As mentioned above, in a number of embodiments, the object selection system 106 can identify and select a target instance based on the object masks. For the object attribute types corresponding to these embodiments (e.g., color, material, relative position, or shape), the object selection system 106 can increase the accuracy of the selection by only considering pixels belonging to the object itself rather than to the background surrounding an instance that are present in an approximate boundary like a bounding box. Thus, in these embodiments, the object selection system 106 can perform the optional act 808 before advancing to the act 810 (described below).

In alternative embodiments, the object selection system 106 can determine the target query object instance from the approximate boundaries corresponding to each of the multiple query object instances. In these embodiments, the object selection system 106 can perform the act 810 (described below) before generating an object mask for a detected target query object instance. Indeed, for a number of object attribute types (e.g., position, location, expression, depth, or size), the object selection system 106 can utilizes the corresponding approximate boundaries (e.g., bounding boxes) to select the target query object instance before generating individual instance object masks. By not generating object masks that will not be selected as the target query object instance (e.g., without generating additional object masks for non-target query object instances of the multiple query object instances), the object selection system 106 can reduce processing and selection time.

As mentioned above, the act 410 can include the act 810 of the object selection system 106 utilizing the selected object attribute detection model to identify the target instance of the query object corresponding to the object attribute. For example, if the object attribute is a "blue" (e.g., the query string is "blue balloon"), the object selection system 106 utilizes the object color detection model to identify each detected balloon in the image that is blue. Additional detail regarding the various object attribute detection neural networks and models is provided with respect to FIGS. 10-14 below.

FIGS. 9A-9D illustrate a graphical user interface of utilizing an object attribute detection neural network to detect a target instance of a query object in accordance with one or more embodiments. For ease in explanation, FIGS. 9A-9D include the client device 300 introduced above. For example, the client device 300 includes an image editing application that implements the image editing system 104 that utilizes the object selection system 106.

Figure 9A:
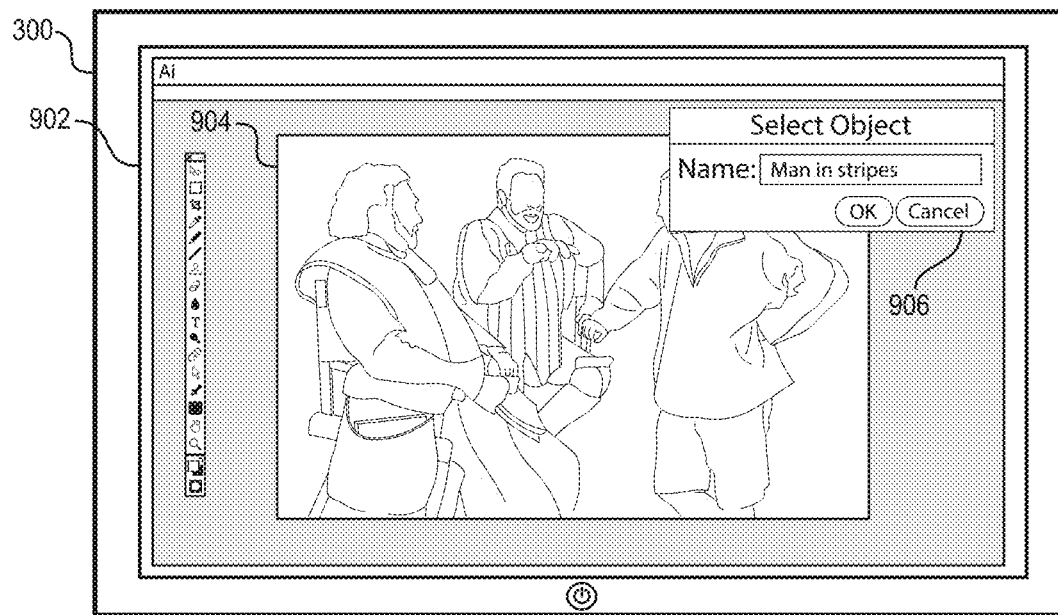
FIGS. 9A-9D illustrate a graphical user interface workflow of utilizing an object attribute detection network to detect a target instance of a query object in accordance with one or more embodiments.

As shown in FIG. 9A, the graphical user interface 902 includes an image 904 within an image editing application. The image 904 shows three men talking. As also shown, the image editing application includes various tools (e.g., a vertical toolbar) having selection options as well as other image editing options. In addition, the graphical user interface 902 includes an object selection request interface 906, as described above in connection with FIG. 3A, where the user provides the query string of "Man in stripes."

Figure 9B:
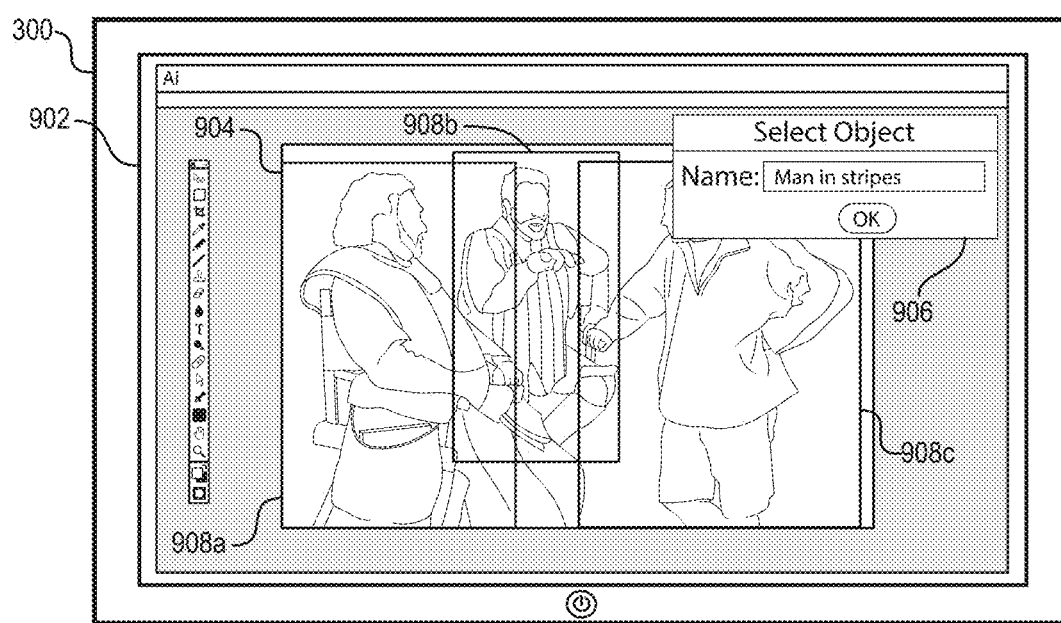

In FIG. 9B, the object selection system 106 can detect three instances of the detected query object (i.e., "man") in the image 904 indicated by three bounding boxes 908a-908c. For example, upon the user receiving the query string from the object selection request interface 906, the object selection system 106 can utilize the object selection pipeline 400 to detect the multiple instances of the detected query object utilizing one or more object detection neural networks, as described above.

Figure 9C:
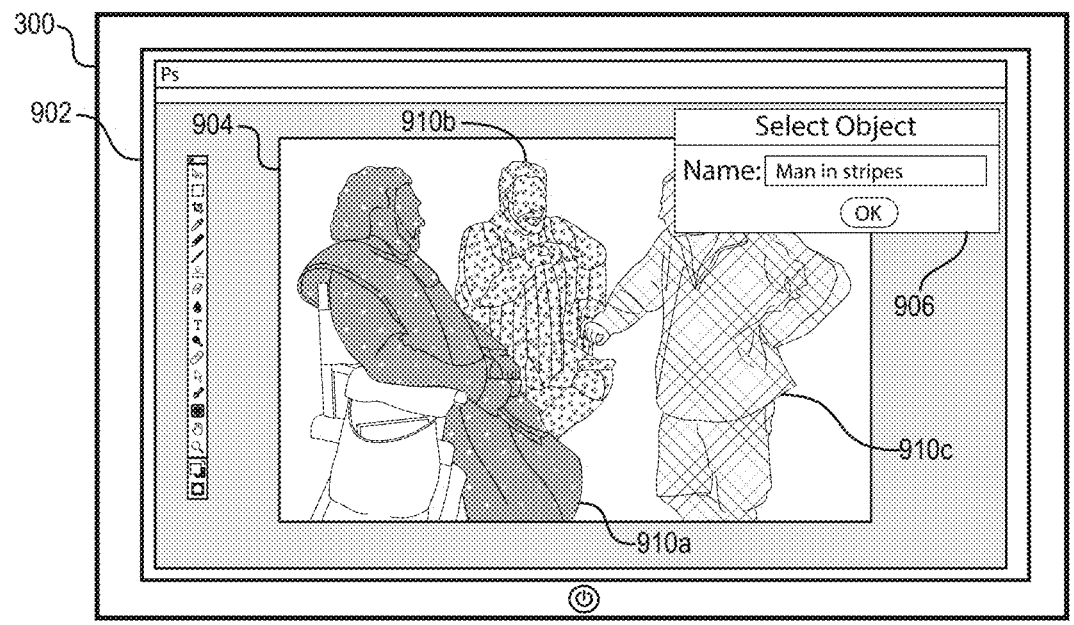

In addition, the object selection system 106 can perform instance segmentation on each of the instances of the detected query object, as illustrated in FIG. 9C. For example, the object selection system 106 utilizes an object mask neural network (e.g., the act 412 of the object selection pipeline 400 in FIG. 4) to generate separate object masks for each of the detected men in the image. As shown in FIG. 9C, the graphical user interface 902 includes a first object mask 910a, a second object mask 910b, and a third object mask 910c.

Further, the object selection system 106 can detect that the query string includes an object attribute (i.e., "stripes"). For instance, the object selection system 106 can parse the query string to determine an adjective that corresponds to an object attribute of the query object. Further, the object selection system 106 can determine an object attribute type (e.g., clothing pattern) for the object attribute.

Figure 9D:
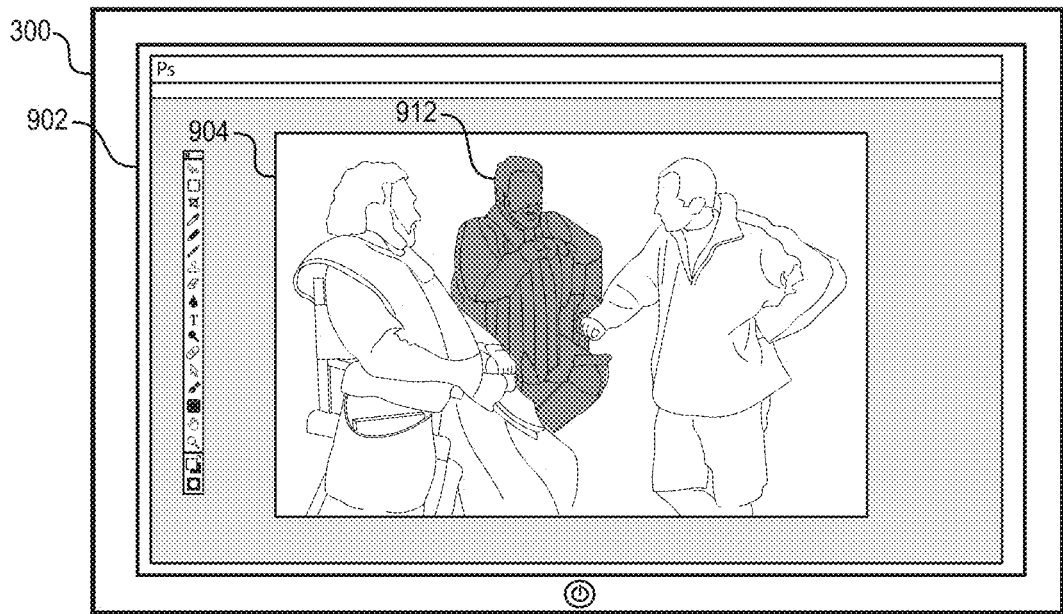

In various embodiments, based on the object attribute and/or object attribute type, the object selection system 106 can select an object attribute detection neural network or model to detect the instance that best corresponds to the object attribute requested by the user. For example, the object selection system 106 can detect an object pattern detection neural network to identify each of the instances that is wearing stripes. As shown in FIG. 9D, the object selection system can deselect the first object mask 910a and the third object mask 910c as these object masks (i.e., the set of pixels included in each object mask) do not include the object attributes of stripes. Accordingly, the object selection system 106 returns the selected target query object 912 to the user within the image editing application.

Notably, FIGS. 9B and 9C show the object selection system 106 utilizing an object attribute detection neural network to select a target instance of the detected query object. In many embodiments, the object selection system 106 does not display corresponding actions to the user. Rather, the object selection system 106 appears to automatically detect and accurately select the target query object in response to the user's query string request (e.g., the graphical user interface 902 skips from FIG. 9A to FIG. 9D). Furthermore, as described above, in some embodiments, the object selection system 106 utilizes three bounding boxes 908a-908c (FIG. 9B) in connection with an object attribute detection neural network to select a target instance of the detected query object. Then, upon selecting the target instance, the object selection system 106 generates an object mask only for the selected target query object.

Figure 10:
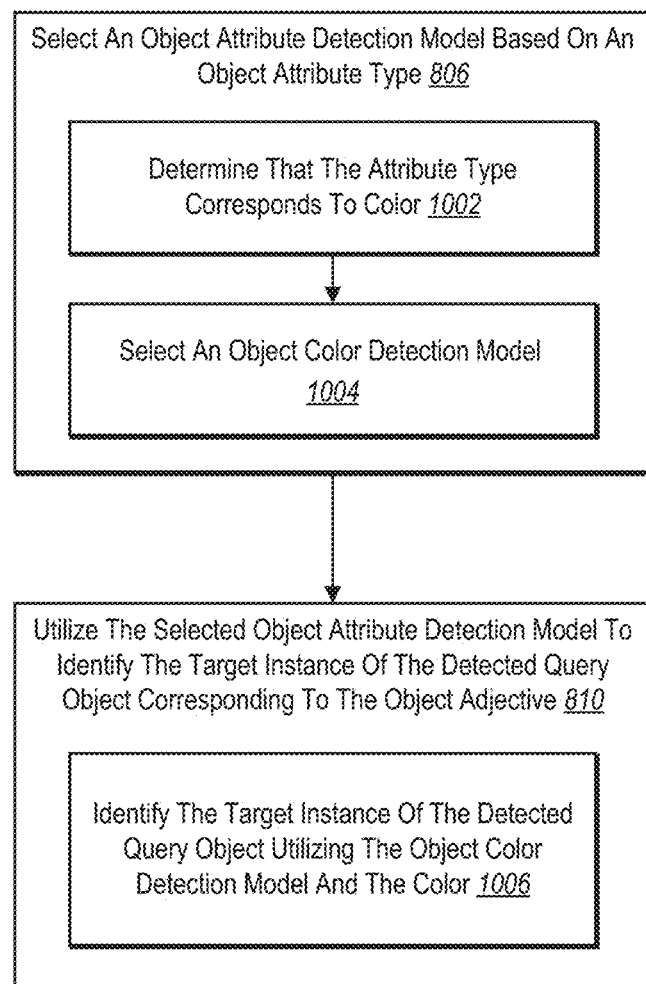
FIG. 10 illustrates a flow chart of detecting a target instance of a query object utilizing an object color attribute detection neural network in accordance with one or more embodiments.

Turning to FIG. 10, a flow chart of detecting a target instance of a query object utilizing an object color attribute detection model is illustrated in accordance with one or more embodiments. As shown and as mentioned above, FIG. 10 expands on the acts 806 and 810 described above with respect to FIG. 8, which itself is an expansion of the act 410 of the object selection pipeline 400. As also shown, FIG. 10 includes the acts 1002-1006, which correspond to the object selection system 106 selecting and utilizing an object color detection model.

As described above, the act 806 can correspond to the object selection system 106 selecting an object attribute detection model based on an object attribute type. More specifically, in a number of embodiments, the object selection system 106 can detect multiple instances of a detected query object indicated in a query string. Further, the object selection system 106 determines that the query string includes one or more adjectives that specify a target query object instance. To select the target query object instance, the object selection system 106 can utilize one of the object attribute detection model trained or created to recognize instances based on object attributes types.

As shown, the act 806 can include the act 1002 of the object selection system 106 determining that the object attribute type corresponds to color. For example, the object selection system 106 analyzes the object attribute (i.e., adjective) within the query string to identify that the user is requesting selection of an instance of the detected query object having a particular color. In some embodiments, the object selection system 106 determines that the object attribute is a color based on matching the object attribute to a name or description of a known color. In various embodiments, the object selection system 106 also detects that one or more object attributes further specify a hue, shade, opacity, brightness, saturation, temperature, and/or tint of a color (e.g., light brown, soft yellow, green, deep purple, hot pink, dull blue, or burnt orange).

Based on detecting that the object attribute is a color, the object selection system 106 can select the object color detection model, as shown in the act 1004. For example, the object selection system 106 selects the object color detection model from among a number of various object attribute detection neural networks and models. In one or more embodiments, the object color detection model comprises the color classifier model described in U.S. patent application Ser. No. 16/518,795, "CLASSIFYING COLORS OF OBJECTS IN DIGITAL IMAGES," filed Jul. 22, 2019, the entirety of which is incorporated herein by reference.

As shown, the act 810 of utilizing the selected object attribute detection model to identify the target instance of the detected query object corresponding to the object attribute can include the act 1006 of the object selection system 106 identifying the target instance of the detected query object utilizing the object color detection model and the color (e.g., the object color attribute indicated in the query string). Indeed, the object selection system 106 can utilize the object color detection model to determine the target instance from the provided color and the multiple instances of the detected query object.

More specifically, in one or more embodiments, the object selection system 106 utilizes the object color detection model to translate or map the color into a mathematical representation (e.g., a color embedding vector) such as a point or region in a color space (e.g., vector space). In addition, for pixels in a given instance of the detected query object, the object color detection model can generate similar embeddings. Further, the object color detection model can compare (i.e., measure utilizing co-sine similarity) the distance between the object color attribute and the given instance to determine which instance or instances correspond to the object color attribute.

In one or more embodiments, the object color detection model generates color embeddings for all pixels of the given instance. In some embodiments, the object color detection model generates color embeddings for a subset of pixels of the given instance. Because many adjacent pixels in an image share the same color attributes, the object selection system 106 can reduce computational costs by generating color embeddings for a selected group of pixels in the given instance.

In some instances, the object selection system 106 can determine whether pixels of the given instance are "valid" pixels. In a number of embodiments, a pixel is valid if the pixel color is close to (e.g., within a predetermined vector space distance) the query color (i.e., the object color attribute). Further, in some embodiments, the object selection system 106 can determine whether a threshold percentage, fraction, and/or number of pixels of the given instance are valid. For example, if more than half of the pixels of the given instance are invalid (e.g., do not match the query color), the object selection system 106 filters out (e.g., dismisses) the given instance from consideration as the target instance.

Similarly, if the object selection system 106 determines that a ratio of valid pixels for the given instance is satisfied (e.g., at or above 10%), then the object selection system 106 can indicate the given instance as the target instance. Indeed, any of the instances of the detected query object that have valid pixel ratios above a predefined threshold, the object selection system 106 can maintain selection of the instances.

As described previously, in some embodiments, the object selection system 106 can identify the target instance based on the object attribute and the approximate boundaries of the instances of the detected query object. In other embodiments, the object selection system 106 utilizes the object masks of the instances. Largely, with respect to determining color matches, the object selection system 106 can utilize the object masks of the instances instead of the less precise approximate boundary (e.g., bounding box) since the approximate boundary often includes background pixels having colors that do not match the object color attribute.

In various embodiments, the object selection system 106 trains or otherwise obtains the object color detection model to identify instances (e.g., a defined group of pixels) that correspond to an input color. For example, the object selection system 106 generates the color space through iterative training as well as trains the object color detection model to accurately map pixel colors to the color space.

Figure 11:
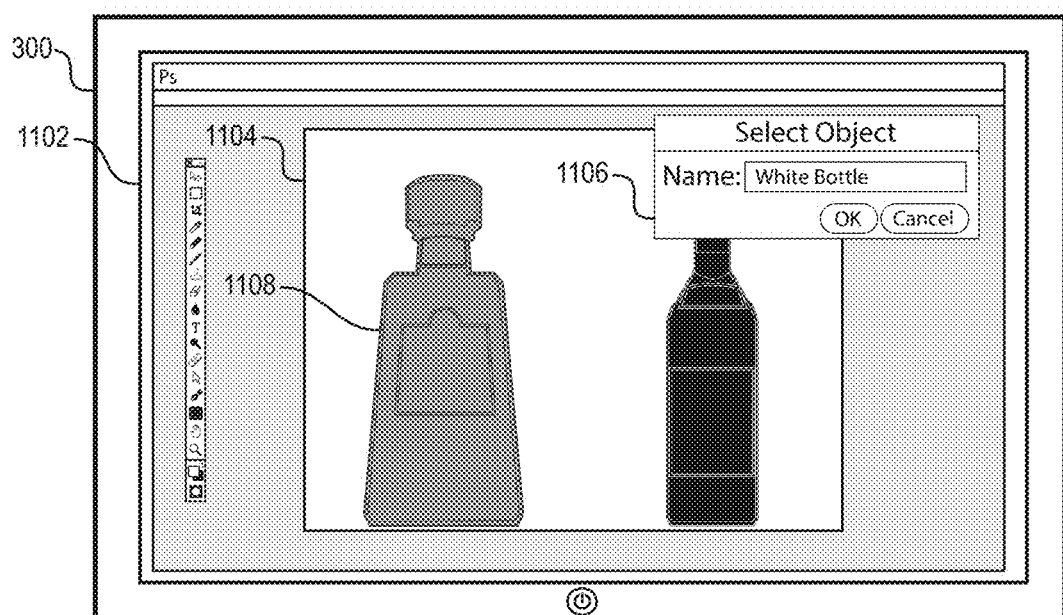
FIG. 11 illustrates a graphical user interface workflow of selecting a query object instance based on an object color attribute in accordance with one or more embodiments.

To illustrate, FIG. 11 shows a graphical user interface of utilizing an object color detection model to detect a target instance of a query object in accordance with one or more embodiments. FIG. 11 includes the client device 300 introduced above. For example, the client device 300 includes an image editing application that implements the image editing system 104 that utilizes the object selection system 106.

As shown in FIG. 11, the graphical user interface 1102 includes an image 1104 within an image editing application. The image 1104 shows a white bottle and a black bottle. In addition, the graphical user interface 1102 includes an object selection request interface 1106, as described above in connection with FIG. 3A, where the user provides the query string of "white bottle."

As described previously, the object selection system 106 utilizes the object selection pipeline 400 to detect the two bottles based on the query object (i.e., "bottle") from the query string. Further, the object selection system 106 determines the object attribute of "white" in the query string, which corresponds to an object color attribute, as described above. Accordingly, the object selection system 106 selects and utilizes the object color detection model to identify and select the white bottle in the image (e.g., the selected target query object 1108). Thus, as shown in FIG. 11, the object selection system 106 returns the selected target query object 1108 to the user within the image editing application.

Figure 12:
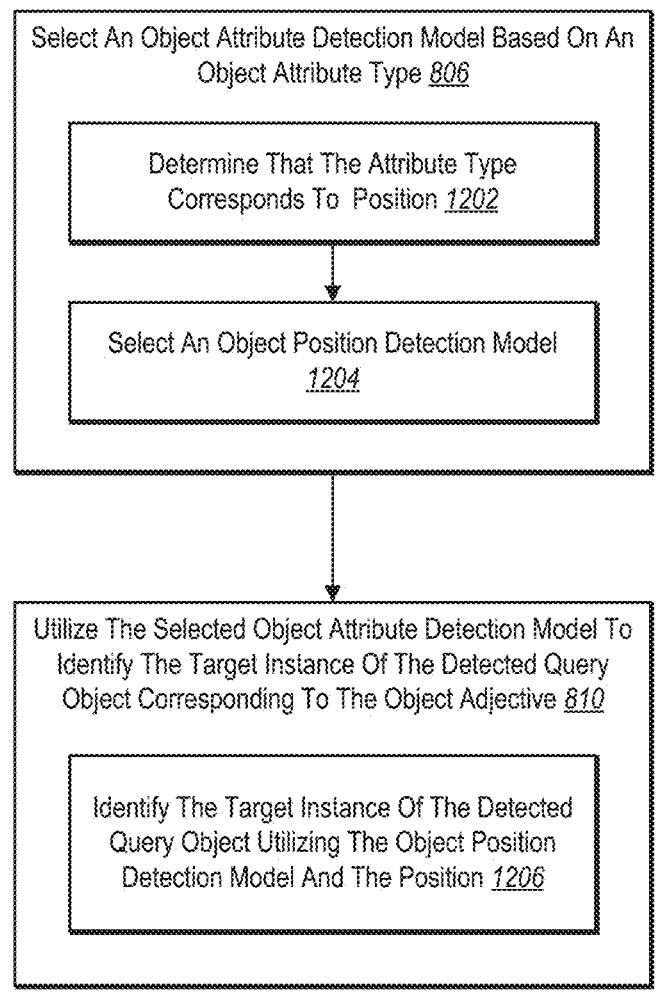
FIG. 12 illustrates a flow chart of detecting a target instance of a query object utilizing an object position attribute model in accordance with one or more embodiments.

Turning to FIG. 12, a flow chart of detecting a target instance of a query object utilizing a position object attribute model is illustrated in accordance with one or more embodiments. As shown and as mentioned above, FIG. 12 expands on the acts 806 and 810 described above with respect to FIG. 8, which itself is an expansion of the act 410 of the object selection pipeline 400. As also shown, FIG. 12 includes the acts 1202-1206 corresponding to the object selection system 106 selecting and utilizing an object position determination model.

As shown, the act 806 can include the act 1202 of the object selection system 106 determining that the object attribute type corresponds to position. For example, based on analyzing the object attribute within the query string, the object selection system 106 determines that the user is requesting selection of an instance of the detected query object having a particular position within the image. In some instances, the object selection system 106 identifies the object position attribute by detecting an adjective in the query string that matches position lexicography, such as "left," "center," "right," "top," "middle," "bottom," "upper," "lower" "above," "below," "outer" "inner."

Based on detecting that the object attribute is a position, the object selection system 106 can select an object position detection model, as shown in the act 1204. For example, the object selection system 106 can select the object position detection model from among multiple object attribute detection neural networks and models, as indicated above.

As shown, the act 810 can include the act 1206 of the object selection system 106 identifying the target instance of the detected query object utilizing the object position detection model and the position (e.g., the object position attribute indicated in the query string). Indeed, the object selection system 106 can utilize the object position detection model to determine the target instance from the provided position and the multiple instances of the detected query object.

To illustrate, in some embodiments, the object selection system 106 can utilize the object position detection model to identify the position of each instance of the detected query object within the image. In some embodiments, the object position detection model utilizes one or more heuristics to compare the positions of each query object instance. For example, the object position detection model can generate image coordinates for each query object instance (e.g., Cartesian coordinates). In addition, the object position detection model can add the image coordinates for each instance to a table or chart to enable the object selection system 106 to compare corresponding instance positions within the image.

In a number of embodiments, the object position detection model determines the position of a query object instance based on its center of mass. For example, the position detection model determines the position of a query object instance as its center of mass coordinates. In some embodiments, the center of mass corresponds to the center mass of the bounding box associated with the query object instance. In alternative embodiments, the center of mass corresponds to the center mass of the object mask associated with the query object instance.

In some embodiments, the object position detection model determines the position of a query object instance based on an outside edge (e.g., the image coordinate of an outer side, corner, or point) of the query object instance (e.g., bounding box or object mask). In additional embodiments, the object position detection model selects the outside edge based on the object position attribute. For example, if the object position attribute is "left," the object position detection model selects the left-most edge or point of each query object instance. Similarly, if the object position attribute is "bottom right," the object position detection model selects the corner point on each query object instance where the lower edge and the right edge meet. Additionally, if the object position attribute is "top center," the object position detection model selects the middle point of the top edge of each query object instance.

In many embodiments, the object position detection model determines the position of a query object instance relative to another object. For example, for the query string of "the car to the left of the tree," the object position detection model identifies and/or detects the tree (e.g., using an object detection neural network or other object detection model). Then, the object position detection model can identify one or more query object instances that are left of the tree. In various embodiments, the object position detection model utilizes one or more approaches described above to identify a query object instance relative to another object in the image.

Upon determining the position for each of the instances of the detected query object, the object selection system 106 (and/or object position detection model) can determine which query object instance satisfies the object position attribute. For example, for the object position attribute of "top," the object selection system 106 can identify the query object instance that has a relative position (e.g., based on its image coordinate) above the other query object instances in the image. As another example, for the object position attribute of "center," the object selection system 106 can identify the query object instance that has a relative position closest to the center of the image. In some instances, for the object position attribute of "middle," the object selection system 106 can identify the query object instance that has a relative position between at least two other query object instances.

In some embodiments, the object selection system 106 determines that multiple instances of the detected query object satisfy the object position attribute. For example, if the object position attribute is "upper," the object selection system 106 can select each query object instance that is above the center horizon (or another vertical coordinate).

Similarly, in various embodiments, if two query object instances have positions within a threshold tolerance of each other, the object selection system 106 can select both query object instances. To illustrate, if the object position attribute is "right," the object selection system 106 can select the query object instance that has the right-most position (e.g., based on its x-axis image coordinate) in the image. Additionally, the object selection system 106 can also select additional query object instances that have an x-axis coordinate within a threshold distance (e.g., 5% of the width or 20 pixels) of the first selected query object instance.

As indicated above, the object selection system 106 can select one or more query object instances that satisfy the object position attribute, as further described below. Indeed, the object selection system 106 can select one or more query object instances based on spatial comparisons of each query object instance within the image. In addition, in some embodiments, the object selection system 106 also filters out one or more query object instances that do not have positions that satisfy the object position attribute.

As explained earlier, depending on the object position attribute, the object selection system 106 may determine and identify the positions of each query object instance based on their approximate boundaries before determining object masks. For example, the object selection system 106 can often perform simple spatial comparisons of the query object instances with high accuracy utilizing their corresponding bounding boxes. In this manner, the object selection system 106 can avoid computing precise object masks for instances that do not satisfy the positional attribute (i.e., object position attribute) specified by the user in the query string.

In various embodiments, the object attribute corresponding to position can include depth. In alternative embodiments, the object selection system 106 utilizes a separate depth attribution detection neural network to identify the target instance corresponding to the specified depth. For instance, the depth attribution detection neural network can generate a depth map of the image to determine relative depths for each of the multiple instances of the detected query object. Examples of depth object attributes include "front," "back," "closer," "farther," "in front" and "behind." Add, in a similar manner as described above, the object selection system 106 can select the one or more query object instances that satisfy the depth object attribute.

Figure 13:
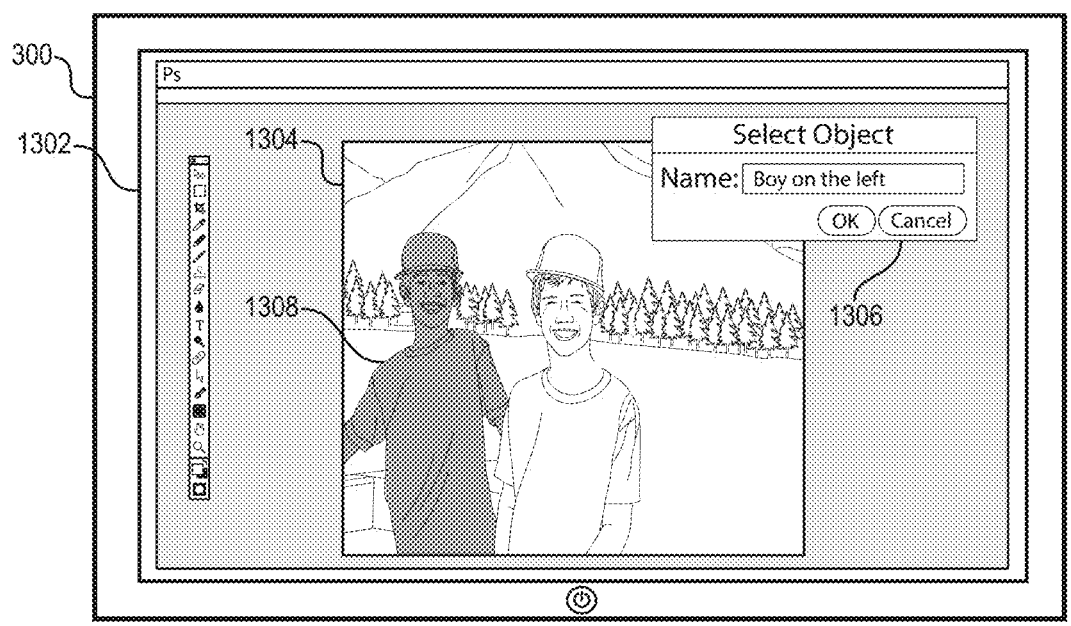
FIG. 13 illustrates a graphical user interface workflow of selecting a query object instance based on an object position attribute in accordance with one or more embodiments.

FIG. 13 illustrates a graphical user interface of utilizing an object position detection model to detect a target instance of a query object in accordance with one or more embodiments. FIG. 13 includes the client device 300 introduced above. For example, the client device 300 includes an image editing application that implements the image editing system 104 that utilizes the object selection system 106.

As shown in FIG. 13, the graphical user interface 1302 includes an image 1304 within an image editing application. The image 1304 shows two boys in the foreground and trees and mountains in the background. The graphical user interface 1302 also includes an object selection request interface 1306, as described above in connection with FIG. 3A, where the user provides the query string of "Boy on the left."

As described previously, the object selection system 106 determines the two boys based on the query object of a "Boy" in the query string utilizing the object selection pipeline 400 as explained above. Further, the object selection system 106 can determine the object attribute of "left" in the query string, which corresponds to an object position attribute, as described above. Accordingly, the object selection system 106 selects and utilizes the object position detection model to identify and select the left boy in the image (e.g., the selected target query object 1308). Thus, as shown in FIG. 13, the object selection system 106 can return the selected target query object 1308 to the user within the image editing application.

While the above embodiments relate to detecting a target query object instance utilizing an object color detection model or an object position detection model, in alternative embodiments, the object selection system 106 can select and utilize other specialized object attribute detection models and neural networks to detect the target query object instance. For example, based on analyzing the adjective in the query string as described above, the object selection system 106 can determine that the attribute is a size, length, shape, material, pattern, location, depth, rigidity/flexibility, prominence, body posture, emotion, facial expression, or other known attribute type of the query object.

Based on detecting the object attribute type, the object selection system 106 can select a corresponding specialized object attribute detection model. For example, if the object attribute type is a material, the object selection system 106 selects an object material detection neural network that identifies materials (e.g., wood, metal, fabric, plastic, ceramic, concrete, glass, composite, or another material) associated with each query object instance. As another example, if the object attribute type is a shape, the object selection system 106 selects a shape attribute model that identifies shapes of each query object instance. In a similar manner, the object selection system 106 can select various specialized object attribute detection neural network or models based on the identified object attribute type. Additionally, the object selection system 106 can identify the target instance of the detected query object utilizing the selected specialized object attribute detection model and the object attribute.

Figure 14:
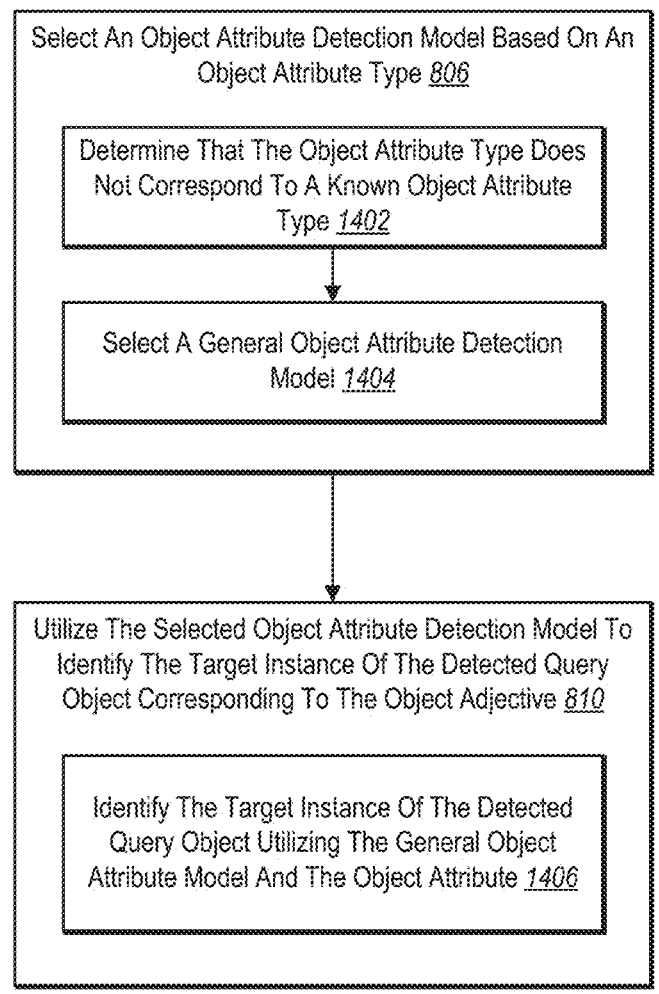
FIG. 14 illustrates a flow chart of detecting a target instance of a query object utilizing a generalized object attribute detection neural network in accordance with one or more embodiments.

Turning to FIG. 14, a flow chart of detecting a target instance of a query object utilizing a generalized object attribute detection model is illustrated in accordance with one or more embodiments. As shown and as mentioned above, FIG. 14 expands on the acts 806 and 810 described above with respect to FIG. 8, which itself is an expansion of the act 410 of the object selection pipeline 400. As also shown, FIG. 14 includes the acts 1402-1406, which correspond to the object selection system 106 selecting and utilizing a generalized object attribute detection neural network.

As shown, the act 806 can include the act 1402 of the object selection system 106 determining that the object attribute type does not correspond to a known object attribute type. For example, based on analyzing the adjective in the query string as described above, the object selection system 106 can determine that the object attribute is not one of the identified or recognized object attribute type. Accordingly, the object selection system 106 can select a generic object attribute detection model, as shown in the act 1404.

As shown, the act 810 in FIG. 14 can include the act 1406 of the object selection system 106 identifying the target instance of the detected query object utilizing the generalized object attribute detection model and the object attribute.

To illustrate, in one or more embodiments, the generic object attribute detection model can generate tags for each query object instance (e.g., utilizing automatic tagging techniques) to associate each instance with various attributes. For example, the generic object attribute detection model is a neural network trained to predict and assign tags to a given image based on one or more attributes and/or characteristics recognized from the image. Indeed, the generic object attribute detection model can discern and extract relevant adjective tags from query object instance bounding boxes.

In particular, the object selection system 106 can provide the bounding box (e.g., crop the image) for each query object instance to a tagging neural network. The tagging neural network can then generate a list of tags for each query object instance. In one or more embodiments, the tagging neural network comprises one of the networks disclosed in Lin et. al., U.S. Patent Pub. No. 2018/0267997, filed on Sep. 20, 2018, which is incorporated herein by reference in its entirety. In particular, the tagging neural network can comprise an encoder and a decoder. The encoder takes the a bounding box (e.g., query object instance) as input to generate a feature map. The decoder decodes the feature map to identify which tags to associate with the query object instance. In one or more embodiments, the tagging neural network is a classification deep neural network that determines a probability (e.g., confidence) that each tag of a set of tags is associated with a query object instance. The tagging neural network can associate a confidence score with each tag. The object selection system 106 can associate tags with the query object instance that have confidence scores above a threshold.

Upon the tagging neural network to automatically tag each of the query object instances, the object selection system 106 can compare the object attribute provided in the query string with the attribute tags generated for each of the query object instances. To illustrate, in one or more embodiments, the object selection system 106 filters out instances that have no correlation or less than a minimum correlation threshold between the attribute tags and the object attribute. Indeed, by analyzing attribute tags of a query object instance with the object attribute from the query string, the object selection system 106 can ignore the query object instances that do not match the object attribute.

In additional, or alternative, embodiments, the object selection system 106 can match attribute tags of a query object instance with the object attribute from the query string to identify which instances correspond to the object attribute. For example, if the object attribute is "happy" from a query string of "happy man," the object selection system 106 analyzes the attribute tags of each query object instance to determine if the tags include "happy" or synonyms of "happy."

Upon filtering out instances with non-corresponding tags and/or identifying instances with corresponding tags, the object selection system 106 can select the particular one or more query object instances corresponding to the object attribute. Thus, even if a specialized object attribute detection model is not available for the object attribute, in most cases, the object selection system 106 can still identify the target query object instance from the object attribute utilizing the generic object attribute detection neural network.

Figure 15:
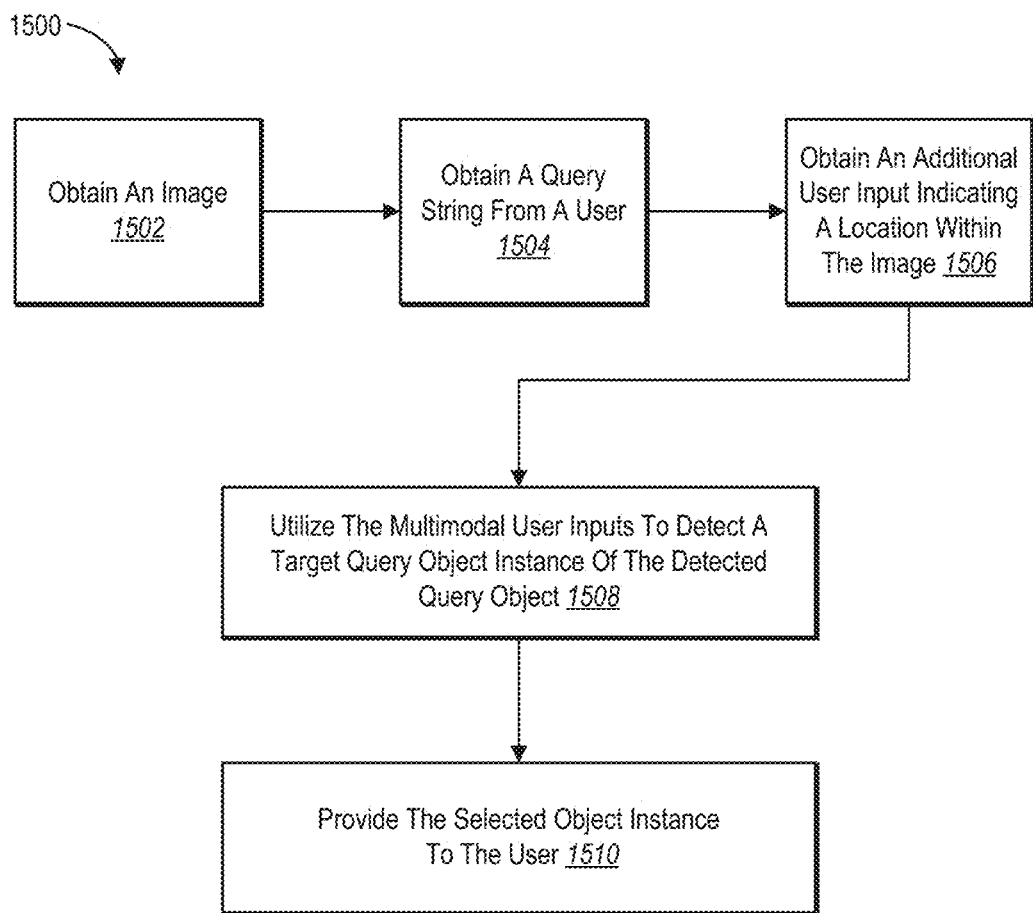
FIG. 15 illustrates a flow chart of detecting and selecting a target instance of a query object in an image based on multimodal inputs in accordance with one or more embodiments.

Turning to FIG. 15, a flow chart of detecting and selecting a target instance of a query object in an image based on multimodal inputs is illustrated in accordance with one or more embodiments. For example, FIG. 15 describes detecting a target query object instance of a detected query object within an image based on additional user input indicating a location in the image. As shown, FIG. 15 includes a series of acts 1500 that the object selection system 106 can perform.

As illustrated, the series of acts 1500 can include the act 1502 of the object selection system 106 obtaining an image. For example, the user captures an image with a camera on a client device associated with the user. Further, the series of acts 1500 can include the act 1504 of the object selection system 106 obtaining a query string from the user, as described previously.

In addition, the series of acts 1500 includes the act 1506 of the object selection system 106 obtaining an additional user input indicating a location within the image. In one or more embodiments, the additional user input is a touch input selection within the image indicating a specific location. In some embodiments, the additional user input is a mouse (or equivalent) input selection within the image indicating the specific location. The location can range from a single point (e.g., pixel coordinate) to a section of the image within the image (e.g., a group of pixels). Further, examples of the additional user input includes a tap, click, swipe, hover, drag, scribble, squiggle, line, or click. Other examples of the additional user input can include a rectangular selection, lasso selection, trace selection, magnetic selection, another type of selection.

As shown, the series of acts 1500 can include the act 1508 of the object selection system 106 utilizing the multimodal user inputs to detect a target query object instance of the detected query object. More particularly, the query string is a first user input and the location indication is an additional user input. Together these multiple distinct user inputs provide the object selection system 106 with the multimodal user inputs that enable the object selection system 106 to more accurately detect and select the target query object instance of the detected query object.

In various embodiments, the query string signals that additional user input includes location information. For example, the object selection system identifies text (e.g., an object attribute) in the query string such as "this" (e.g., "this car") or "here" (e.g., the "cup here") indicating that the user has provided (or will provide) location input in connection with the query string. For instance, upon the object selection system 106 can receive the request to select "this elephant," the object selection system 106 provides an additional prompt for the user to click, tap, outline, squiggle, or otherwise indicate the location of the elephant within the image.

Further, the object selection system 106 can utilize the user location input to select the target query object instance and/or filter out the other query object instances of the detected query object. For example, utilizing the indicated location from the additional user input the object selection system 106 can filter out instances of the detected query object that do not match the indicated location or that are beyond a threshold distance from the indicated location. As another example, the object selection system 106 can rank or sort the multiple query object instances based on their distance to the indicated location, where a higher rank corresponds to a higher probability of being the target query object instance. Additionally, the object selection system 106 can select the object mask of the instance that has a center closest to the indicated location. In this manner, the object selection system 106 can utilize the user location input in a similar manner as an object attribute identified in a query string As shown in FIG. 15, the series of acts 1500 can include the act 1510 of the object selection system 106 providing the selected query object instance to the user. As described above, the object selection system 106 can automatically select the target query object instance within the image editing application in response to the selection query, which, in this case, includes multimodal input.

Figure 16:
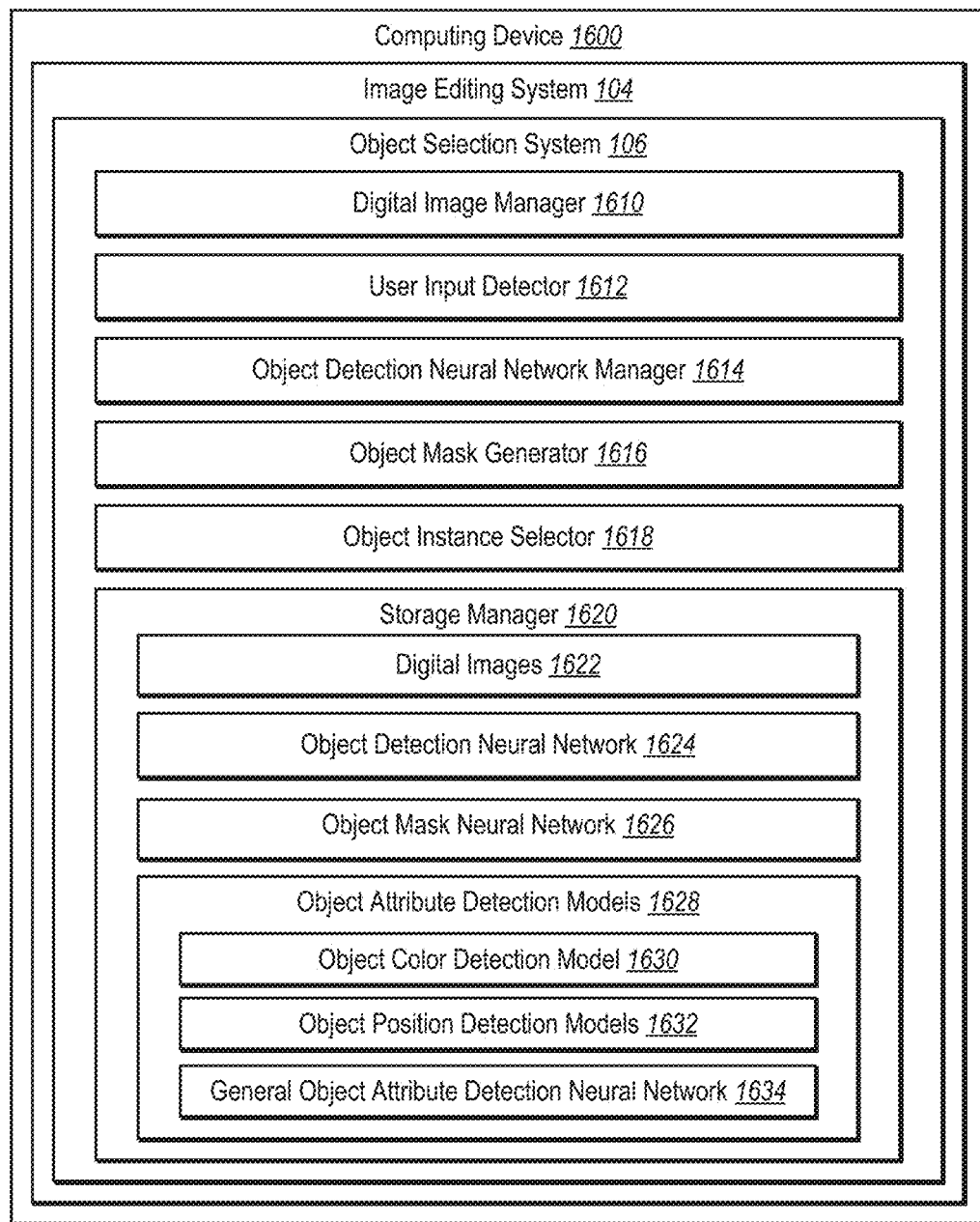
FIG. 16 illustrates a schematic diagram of the object selection system in accordance with one or more embodiments.

Referring now to FIG. 16, additional detail is provided regarding capabilities and components of the object selection system 106 in accordance with one or more embodiments. In particular, FIG. 16 shows a schematic diagram of an example architecture of the object selection system 106 implemented within the image editing system 104 and hosted on a computing device 1600. The image editing system 104 can correspond to the image editing system 104 described previously in connection with FIG. 1.

As shown, the object selection system 106 is located on a computing device 1600 within an image editing system 104. In general, the computing device 1600 may represent various types of client devices. For example, in some embodiments, the client is a mobile device, such as a laptop, a tablet, a mobile telephone, a smartphone, etc. In other embodiments, the computing device 1600 is a non-mobile device, such as a desktop or server, or another type of client device. Additional details with regard to the computing device 1600 are discussed below as well as with respect to FIG. 18.

As illustrated in FIG. 16, the object selection system 106 includes various components for performing the processes and features described herein. For example, the object selection system 106 includes a digital image manager 1610, a user input detector 1612, an object detection neural network manager 1614, an object mask generator 1616, an object instance selector 1618 and a storage manager 1620. As shown, the storage manager 1620 includes digital images 1622, an object detection neural network 1624, an object mask neural network 1626, and object attribute detection models 1628. Each of the components mentioned above is described below in turn.

As mentioned above, the object selection system 106 includes the digital image manager 1610. In general, the digital image manager 1610 facilitates identifying, accessing, receiving, obtaining, generating, importing, exporting, copying, modifying, removing, and organizing images. In one or more embodiments, the digital image manager 1610 operates in connection with an image editing system 104 (e.g., an image editing application) to access and edit images, as described previously. In some embodiments, the digital image manager 1610 communicates with the storage manager 1620 to store and retrieve the digital images 1622, for example, within a digital image database managed by the storage manager 1620.

As shown, the object selection system 106 includes the user input detector 1612. In various embodiments, the user input detector 1612 can detect, receive, and/or facilitate user input on the computing device 1600 in any suitable manner. In some instances, the user input detector 1612 detects one or more user interactions (e.g., a single interaction, or a combination of interactions) with respect to a user interface. For example, the user input detector 1612 detects a user interaction from a keyboard, mouse, touch page, touch screen, and/or any other input device in connection with the computing device 1600. For instance, the user input detector 1612 detects user input of a query string submitted from an object selection request interface requesting automatic selection of an object within an image. In addition, the user input detector 1612 detects an additional user input from a mouse selection and/or a touch input to indicate an object location within the image, as described above.

As shown, the object selection system 106 includes the object detection neural network manager 1614. In various embodiments, the object detection neural network manager 1614 maintains, creates, generates, trains, updates, accesses, and/or utilizes the object detection neural networks disclosed herein. As described above, the object detection neural network manager 1614 detects one or more objects within an image (e.g., a query object) and generates an approximate boundary (e.g., a bounding box) to indicate the detected object.

In addition, in a number of embodiments, the object detection neural network manager 1614 can communicate with the storage manager 1620 to store, access, and utilize the object detection neural network 1624. As mentioned above, in various embodiments, the object detection neural network 1624 can include one or more specialist object detection neural networks, object-based concept detection neural networks, known object class detection neural networks, unknown object class detection neural networks, object proposal neural networks, regional proposal neural networks, concept embedding neural networks.

In addition, as shown, the object selection system 106 includes the object mask generator 1616. In one or more embodiments, the object mask generator 1616 produces, creates, and/or generates accurate object masks from detected objects. For example, the object detection neural network manager 1614 provides an approximate boundary of an object (e.g., a detected query object) to the object mask generator 1616, which utilizes the object mask neural network 1626 to generate an object mask of the detected object, as described above. As also explained above, in various embodiments, the object mask generator 1616 generates multiple object masks when multiple instances of the query object are detected.

As also shown, the object selection system 106 includes the object instance selector 1618. In some embodiments, the object instance selector 1618 determines, analyzes, detects, identifies, filters, and/or selects one or more target instances of a detected object from multiple instances of the detected object. In various embodiments, the object instance selector 1618 utilizes one or more object attribute detection models 1628 to identify a target instance, as described above. For instance, the object instance selector 1618 utilizes an object attribute to select a target instance for multiple instances of the detected object.

Examples of object attribute detection models 1628 include, but are not limited to, an object color detection model 1630, an object position detection model 1632, a generalized object attribute detection neural network 1634, and/or other object attribute detection neural network and models (e.g., an object depth detection neural network, an object material detection neural network, an object shape detection model, an object size detection neural network, an object length detection neural network, an object pattern detection neural network, an object location detection model, an object body posture detection neural network, an object prominence detection neural network, an object facial expression detection neural network, or an object quality detection neural network).

Each of the components 1610-1634 of the object selection system 106 can include software, hardware, or both. For example, the components 1610-1634 can include one or more instructions stored on a computer-readable storage medium and executable by processors of one or more computing devices, such as a client device (e.g., a mobile client device) or server device. When executed by the one or more processors, the computer-executable instructions of the object selection system 106 can cause a computing device to perform the feature learning methods described herein. Alternatively, the components 1610-1634 can include hardware, such as a special-purpose processing device to perform a certain function or group of functions. In addition, the components 1610-1634 of the object selection system 106 can include a combination of computer-executable instructions and hardware.

Furthermore, the components 1610-1634 of the object selection system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1610-1634 may be implemented as a stand-alone application, such as a desktop or mobile application. Additionally, the components 1610-1634 may be implemented as one or more web-based applications hosted on a remote server. The components 1610-1634 may also be implemented in a suite of mobile device applications or "apps." To illustrate, the components 1610-1634 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

FIGS. 1-16, the corresponding text, and the examples provide a number of different methods, systems, devices, and non-transitory computer-readable media of the object selection system 106. In addition to the foregoing, one or more embodiments can also be described in terms of flowcharts comprising acts for accomplishing a particular result, such as the flowcharts of acts shown in FIG. 17. Additionally, the acts described herein may be repeated or performed in parallel with one another or parallel with different instances of the same or similar acts.

Figure 17:
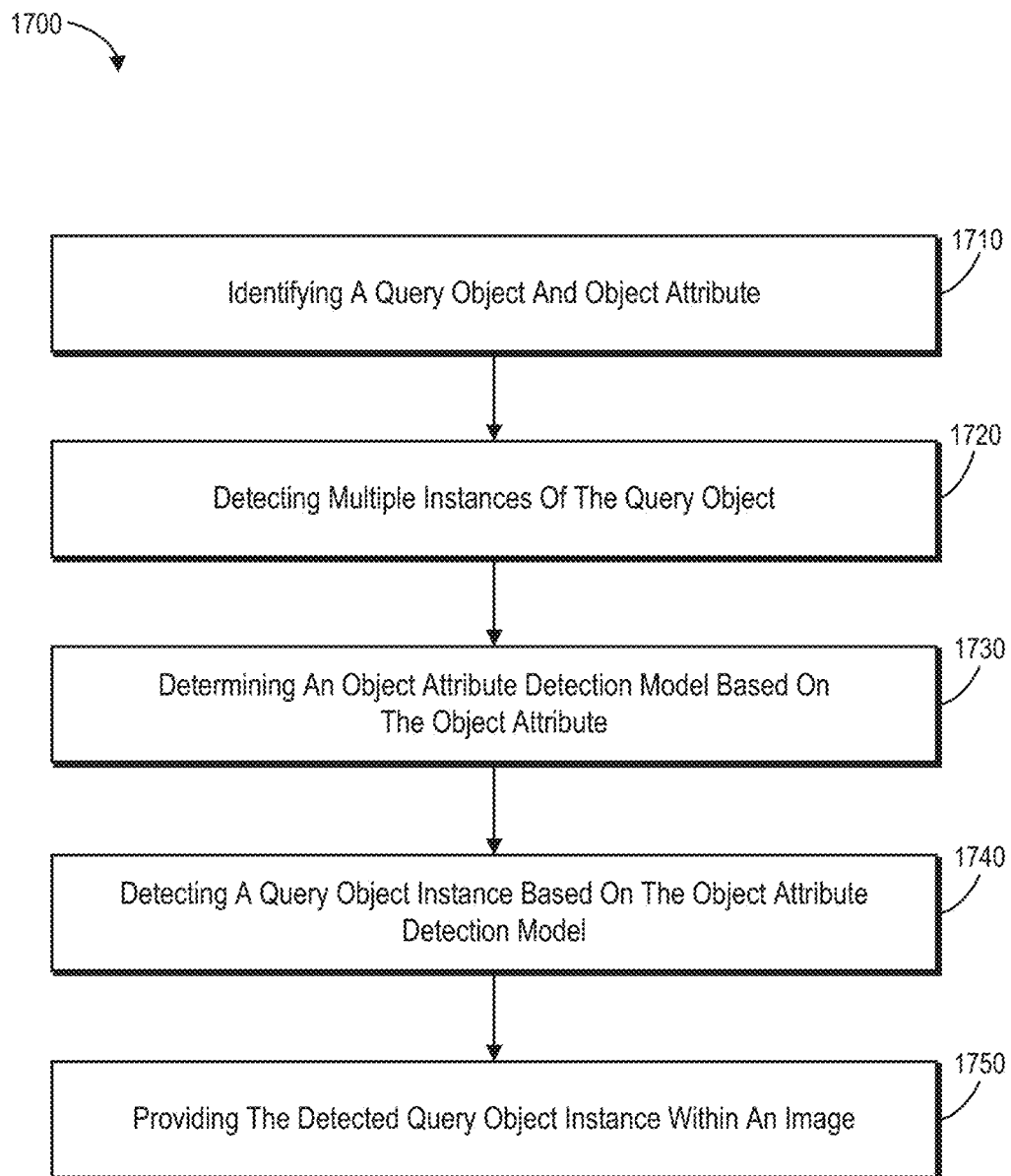
FIG. 17 illustrates a flowchart of a series of acts for utilizing one of multiple object attribute detection models to detect a query object instance in accordance with one or more embodiments.

As mentioned, FIG. 17 illustrates a flowchart of a series of acts 1700 for utilizing one of multiple object attribute detection models to detect a query object instance in accordance with one or more embodiments. While FIG. 17 illustrates acts according to one embodiment, alternative embodiments may omit, add to, reorder, and/or modify any of the acts shown in FIG. 17. The acts of FIG. 17 can be performed as part of a method. Alternatively, a non-transitory computer-readable medium can comprise instructions that, when executed by one or more processors, cause a computing device to perform the acts of FIG. 17. In some embodiments, a system can perform the acts of FIG. 17.

In one or more embodiments, the series of acts 1700 is implemented on one or more computing devices, such as the client device 102, the server device 110, the client device 300, or the computing device 1600. In addition, in some embodiments, the series of acts 1700 is implemented in a digital environment for creating or editing digital content (e.g., digital images). For example, the series of acts 1700 is implemented on a computing device having memory that includes a digital image; a query including a query object and an object attribute (e.g., an object color attribute or an object position attribute) that corresponds to the query object; and a trained object detection neural network.

The series of acts 1700 includes an act 1710 of identifying a query object and object attribute. In particular, the act 1710 can involve identifying, from a selection query corresponding to a digital image, a query object and a corresponding object attribute. In various embodiments, the act 1710 can include identifying the query object as a noun in the query (e.g., query string) and the object attribute as an adjective in the query.

As shown, the series of acts 1700 also includes an act 1720 of detecting multiple instances of the query attribute. In particular, the act 1720 can involve detecting multiple instances of the query object in the digital image utilizing an object detection model. In one or more embodiments, the act 1720 can include identifying a separate bounding box within the digital image for each of the multiple query object instances. In various embodiments, the act 1720 can include identifying a separate object mask within the digital image for each of the multiple query object instances. In some embodiments, the object detection model is a trained object detection neural network. In alternative embodiments, the object detection model is not a machine-learning model, such as a combination of a region proposals detectors or another type of object detector.

As shown in FIG. 17, the series of acts 1700 further includes an act 1730 of determining an object attribute detection model based on the query object. In particular, the act 1730 can include determining an object attribute detection model from a plurality of object attribute detection models based on analyzing the object attribute. In one or more embodiments, the act 1730 can include selecting, based on determining that the object attribute corresponds to a material, an object material detection neural network as the determined object attribute detection model. In some embodiments, the act 1730 can include selecting, based on determining that the object attribute corresponds to an object size, an object size detection model as the determined object attribute detection model.

As shown, the series of acts 1700 also includes an act 1740 of detecting a query object instance based on the object attribute detection model. In particular, the act 1740 can include detecting a first query object instance from the multiple query object instances is a target query object instance based on the object attribute and the determined object attribute detection model. The act 1740 can include a number of further actions and sub-actions, as described below.

In one or more embodiments, the act 1740 can include analyzing the object attribute to identify an indicated position within the digital image. In these embodiments, the act 1740 can also include determining positions within the digital image for each of the multiple query object instances utilizing an object position attribute detection model. Act 17440 can also involve detecting the first query object instance is the target query object instance based on the first query object instance having a position in the digital image that is closest to the indicated position.

In various embodiments, the act 1740 can include analyzing the object attribute to identify an indicated relative object position. In these embodiments, the act 1740 can also include identifying center positions for each of the multiple query object instances within the digital image utilizing an object position attribute detection model, comparing a first center position of the first query object instance to a second center position of a second query object instance of the multiple query object instances to identify a first relative position for the first query object instance, and detecting the first query object instance is the target query object instance based on the first relative position for the first query object instance corresponding to the indicated relative object position.

In some embodiments, the act 1740 can include analyzing the object attribute to identify an indicated object depth. In these embodiments, the act 1740 can also include generating a depth map of the image utilizing a depth map neural network; identifying, based on the depth map, a first depth of the first query object instance utilizing the depth map neural network; and detecting the first query object instance is the target query object instance based on the first depth of the first query object instance corresponding to the indicated object depth.

In one or more embodiments, the act 1740 can include analyzing the object attribute to identify an indicated color. In these embodiments, the act 1740 can also include identifying a color for each of the multiple query object instances in the digital image utilizing an object color attribute detection model as well as determining, based on comparing the color identified for each of the multiple query object instances to the indicated color, that the first query object instance has a greater correspondence to the indicated color than other instances of the multiple query object instances. In additional embodiments, the act 1740 can include identifying the color for the first query object instance utilizing the object color attribute detection model based on comparing one or more pixels of the first query object instance to the indicated color in a multi-dimensional color space.

In various embodiments, the act 1740 can include determining, based on analyzing the object attribute, that the object attribute does not correspond to a known object attribute type. In these embodiments, the act 1740 can also include generating tags for one or more of the multiple query object instances utilizing a tagging neural network and detecting the first query object instance as the target query object instance based on matching the object attribute with a tag generated for the first query object instance. In additional embodiments, the act 1740 can include filtering out one or more other query object instances of the multiple query object instances based on the one or more other instances of the multiple query object instances having tags not corresponding to the object attribute.

As shown in FIG. 17, the series of acts 1700 also includes an act 1750 of providing the selected query object instance within an image. In particular, the act 1750 can involve providing the digital image with the detected first query object instance in response to the selection query. In some embodiments, the act 1750 includes automatically selecting the detected query object within an image editing application utilizing the first object mask.

In one or more embodiments, the act 1750 can include generating, utilizing an object mask neural network, a first object mask for the first query object instance without generating additional object masks for other query object instances of the multiple query object instances. In additional embodiments, the act 1750 can include utilizing the first object mask to select the first query object within the image.

In some embodiments, the acts 1730 and 1740 can also include the acts of determining that the object attribute corresponds to a color, identifying one or more colors for each of the multiple query object instances in the digital image, and determining that a first query object instance from the multiple query object instances includes a first color that corresponds to the object color attribute in the query utilizing an object color detection model. In these embodiments, the act 1740 can also include generating separate object masks for each of the multiple query object instances before identifying the one or more colors for each of the multiple query object instances and identifying the first color of the first query object instance based on analyzing one or more pixels of a first object mask that corresponds to the first query object instance.

Further, in one or more embodiments, determining that the first query object instance includes the first color that correspond to the object color attribute in the query is based on determining that a threshold number of pixels in the first object mask corresponds to the object color attribute in the query (e.g., valid pixels). In some embodiments, determining that the first color of the first query object instance corresponds to the object color attribute in the query is based on generating a first color vector for the first color of the first query object instance utilizing the object color detection model, generating an object color attribute vector for the object color attribute of the query utilizing the object color detection model, and determining that the first color vector corresponds to the object color attribute vector with a vector space generated by the object color detection model.

In various embodiments, the acts 1730 and 1740 can include the acts of determining that the object attribute is an object position attribute that indicates a position of a query object instance within the image, identifying positions for each of the multiple query object instances in the digital image and determining that a first query object instance from the multiple query object instances has a first position that corresponds to the object position attribute in the query utilizing an object position detection. In one or more embodiments, the act 1740 can also include generating bounding boxes for each of the multiple query object instances.

Further, in these embodiments, identifying the positions for each of the multiple query object instances in the digital image is based on the bounding boxes generated for each of the multiple query object instances. In additional embodiments, the act 1750 can include generating, utilizing an object mask neural network, a first object mask for the first query object instance (e.g., based on determining that the first query object instance corresponds to an object position attribute) without generating additional object masks for other query object instances of the multiple query object instances.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object selection system to create, execute, and/or modify the object selection pipeline as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 18:
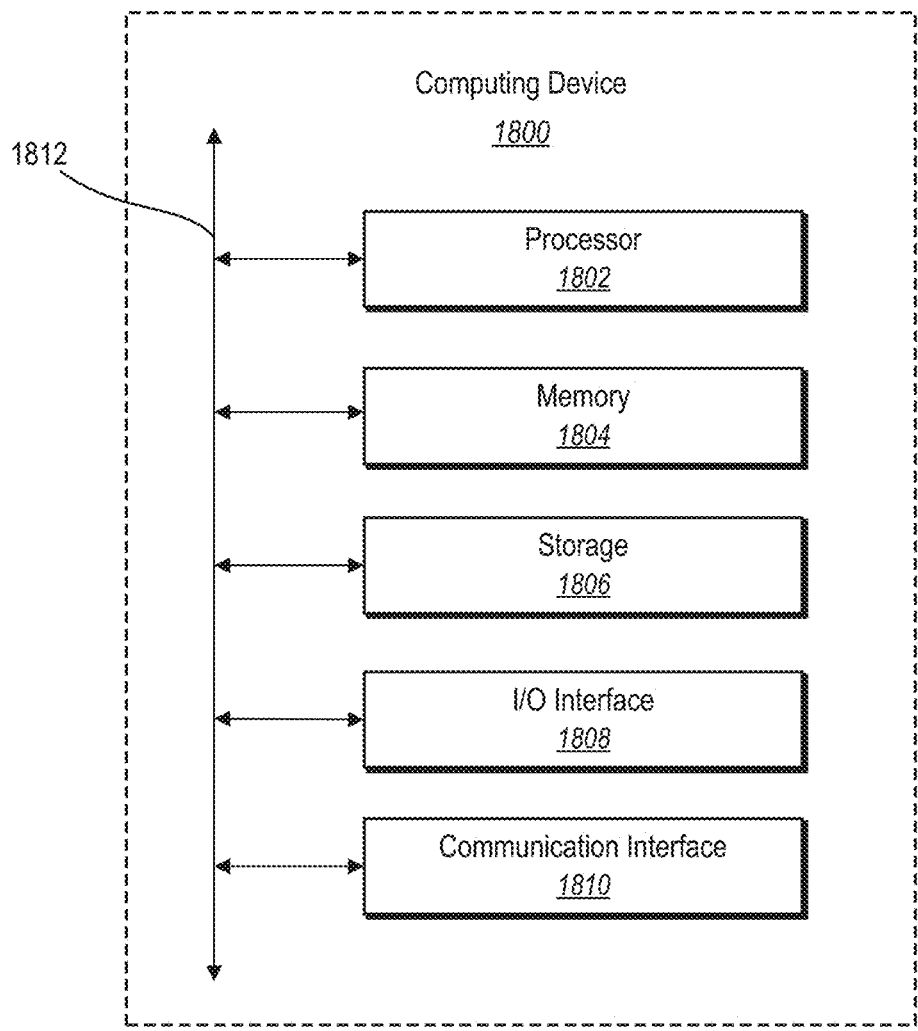
FIG. 18 illustrates a block diagram of an example computing device for implementing one or more embodiments of the present disclosure.

FIG. 18 illustrates a block diagram of an example computing device 1800 that may be configured to perform one or more of the processes described above. One will appreciate that one or more computing devices, such as the computing device 1800 may represent the computing devices described above (e.g., client device 102, the server device 110, the client device 300, or the computing device 1600). In one or more embodiments, the computing device 1800 may be a mobile device (e.g., a laptop, a tablet, a smartphone, a mobile telephone, a camera, a tracker, a watch, a wearable device, etc.). In some embodiments, the computing device 1800 may be a non-mobile device (e.g., a desktop computer, a server device, a web server, a file server, a social networking system, a program server, an application store, or a content provider). Further, the computing device 1800 may be a server device that includes cloud-based processing and storage capabilities.

As shown in FIG. 18, the computing device 1800 can include one or more processor(s) 1802, memory 1804, a storage device 1806, input/output ("I/O") interfaces 1808, and a communication interface 1810, which may be communicatively coupled by way of a communication infrastructure (e.g., bus 1812). While the computing device 1800 is shown in FIG. 18, the components illustrated in FIG. 18 are not intended to be limiting. Additional or alternative components may be used in other embodiments. Furthermore, in certain embodiments, the computing device 1800 includes fewer components than those shown in FIG. 18. Components of the computing device 1800 shown in FIG. 18 will now be described in additional detail.

In particular embodiments, the processor(s) 1802 includes hardware for executing instructions, such as those making up a computer program. As an example, and not by way of limitation, to execute instructions, the processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1804 may be internal or distributed memory.

The computing device 1800 includes a storage device 1806 includes storage for storing data or instructions. As an example, and not by way of limitation, the storage device 1806 can include a non-transitory storage medium described above. The storage device 1806 may include a hard disk drive (HDD), flash memory, a Universal Serial Bus (USB) drive or a combination these or other storage devices.

As shown, the computing device 1800 includes one or more I/O interfaces 1808, which are provided to allow a user to provide input to (e.g., user strokes), receive output from, and otherwise transfer data to and from the computing device 1800. These I/O interfaces 1808 may include a mouse, keypad or a keyboard, a touch screen, camera, optical scanner, network interface, modem, other known I/O devices or a combination of these I/O interfaces 1808. The touch screen may be activated with a stylus or a finger.

The I/O interfaces 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1808 are configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 provides one or more interfaces for communication (such as, for example, packet-based communication) between the computing device and one or more other computing devices or one or more networks. As an example, and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1812. The bus 1812 can include hardware, software, or both that connects components of computing device 1800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    based on identifying a digital image comprising a plurality of detectable objects, receive user input from a client device comprising a selection query indicating a target query object to be selected within the digital image;
    analyze the selection query to identify a first detection input comprising a query object and a second detection input comprising an object attribute corresponding to the query object;
    based on the first detection input, detect multiple query object instances in the digital image from the plurality of detectable objects utilizing an object detection neural network;
    based on the second detection input, select, from a plurality of object attribute detection models designed to identify respective object attributes, an object attribute detection model specifically trained to identify the object attribute indicated by the selection query;
    detect that a first query object instance from the multiple query object instances is the target query object by utilizing the object attribute detection model to determine that the first query object instance reflects the object attribute by analyzing object masks for the multiple query object instances to identify which of the object masks include the object attribute by determining that a first relative position for the first query object instance corresponds to the object attribute based on comparing a first center position of the first query object instance to a second center position of a second query object instance of the multiple query object instances to identify the first relative position for the first query object instance; and
    provide, to the client device, the digital image with the target query object selected in response to the selection query.

2. The non-transitory computer-readable medium of claim 1, further comprising instructions that, when executed by the at least one processor, cause the computing device to parse the selection query from the client device to determine:
    a noun that identifies the query object; and
    an adjective that identifies the object attribute.

3. The non-transitory computer-readable medium of claim 1, further comprising instructions that, when executed by the at least one processor, cause the computing device to:
    determine, from the object attribute of the selection query, an indicated position of the query object within the digital image; and
    detect that the first query object instance is the target query object by:
        determining positions within the digital image for each of the multiple query object instances utilizing an object position attribute detection model; and
        detecting the first query object instance is the target query object based on the first query object instance having a position in the digital image that is closest to the indicated position.

4. The non-transitory computer-readable medium of claim 1, further comprising instructions that, when executed by the at least one processor, cause the computing device to:
    determine, from the object attribute of the selection query, an indicated relative object position of the query object within the digital image; and
    detect the first query object instance is the target query object based on the first relative position for the first query object instance corresponding to the indicated relative object position.

5. The non-transitory computer-readable medium of claim 1, further comprising instructions that, when executed by the at least one processor, cause the computing device to:
    determine, from the object attribute of the selection query, an indicated object depth of the query object within the digital image; and
    detect the first query object instance is the target query object by:
        generating a depth map of the digital image utilizing a depth map neural network;
        identifying, based on the depth map, a first positional depth of the first query object instance utilizing the depth map neural network; and
        detecting the first query object instance is the target query object based on the first positional depth of the first query object instance corresponding to the indicated object depth.

6. The non-transitory computer-readable medium of claim 1, further comprising instructions that, when executed by the at least one processor, cause the computing device to:
    determine, from the object attribute of the selection query, an indicated facial expression of the query object within the digital image; and
    detect the first query object instance is the target query object by determining that the first query object instance reflects the indicated facial expression.

7. The non-transitory computer-readable medium of claim 1, further comprising instructions that, when executed by the at least one processor, cause the computing device to:
    determine, from the object attribute of the selection query, an object shape of the query object within the digital image; and
    detect the first query object instance is the target query object by identifying the first query object instance corresponding to the object shape.

8. The non-transitory computer-readable medium of claim 1, further comprising instructions that, when executed by the at least one processor, cause the computing device to:
    determine, from the object attribute of the selection query, an indicated color of the query object within the digital image; and detect the first query object instance is the target query object by:
    identifying a color for each of the multiple query object instances in the digital image utilizing an object color attribute detection model; and
    determining, based on comparing the color identified for each of the multiple query object instances to the indicated color, that the first query object instance has a greater correspondence to the indicated color than other instances of the multiple query object instances.

9. The non-transitory computer-readable medium of claim 8, further comprising instructions that, when executed by the at least one processor, cause the computing device to identify the color for the first query object instance utilizing the object color attribute detection model by comparing one or more pixels of the first query object instance to the indicated color in a multi-dimensional color space.

10. The non-transitory computer-readable medium of claim 1, further comprising instructions that, when executed by the at least one processor, cause the computing device to:
    determine that the object attribute does not correspond to a known object attribute type; and
    detect, based on determining that the object attribute does not correspond to a known object attribute type, the first query object instance is the target query object by:
        generating tags for one or more of the multiple query object instances utilizing a tagging neural network; and
        matching the object attribute with a tag generated for the first query object instance.

11. The non-transitory computer-readable medium of claim 10, wherein the instructions, when executed by the at least one processor, cause the computing device to detect the first query object instance is the target query object by filtering out one or more other query object instances of the multiple query object instances based on the one or more other query object instances having tags not corresponding to the object attribute.

12. The non-transitory computer-readable medium of claim 1, further comprising instructions that, when executed by the at least one processor, cause the computing device to:
    determine, from the object attribute of the selection query, an indicated object material of the query object within the digital image; and
    detect the first query object instance is the target query object by identifying the first query object instance corresponding to the indicated object material utilizing an object material detection model.

13. The non-transitory computer-readable medium of claim 1, further comprising instructions that, when executed by the at least one processor, cause the computing device to:
    determine, from the object attribute of the selection query, an indicated object size of the query object within the digital image; and
    detect the first query object instance is the target query object by identifying the first query object instance corresponding to the indicated object size utilizing an object size detection model.

14. A system for automatically selecting objects within digital images comprising:
    a memory device comprising:
        a digital image;
        a selection query indicating a target query object to be selected within the digital image by comprising a first detection input indicating a query object and a second detection input indicating an object attribute that corresponds to the query object; and
        an object detection neural network; and
    at least one processor configured to cause the system to:
        based on identifying the first detection input indicating the query object in the selection query, detect multiple query object instances of the query object in the digital image utilizing the object detection neural network and the first detection input;
        based on the second detection input indicating the object attribute from the selection query, select, from among a plurality of object attribute detection models designed to identify respective object attributes, an object attribute detection model specifically trained to identify the object attribute indicated by the selection query;
        detect that a first query object instance from the multiple query object instances is the target query object by utilizing the object attribute detection model to determine that the first query object instance reflects the object attribute by analyzing object masks for the multiple query object instances to identify which of the object masks include the object attribute by determining that a first relative position for the first query object instance corresponds to the object attribute based on comparing a first center position of the first query object instance to a second center position of a second query object instance of the multiple query object instances to identify the first relative position for the first query object instance; and
        provide the digital image with the first query object instance selected for digital editing within the digital image in response to the selection query.

15. The system of claim 14, wherein the at least one processor is configured to cause the system to detect multiple query object instances in the digital image by:
    generating approximate boundaries for the multiple query object instances utilizing the object detection neural network; and
    generating an object mask for each of the multiple query object instances from the approximate boundaries utilizing an object mask neural network.

16. The system of claim 15, wherein the at least one processor is further configured to cause the system to:
    determine, based on a third detection input of the selection query, an additional object attribute of the query object within the digital image; and
    detect the first query object instance is the target query object by determining that the first query object instance reflects the object attribute and reflects the additional object attribute utilizing an object attribute detection model and an additional attribute detection model.

17. The system of claim 16, wherein the at least one processor is further configured to cause the system to determine that pixels in a first object mask more closely correspond to a first color than pixels in object masks for other query objects instances of the multiple query object instances.

18. In a digital medium environment for creating or editing digital images, a computer-implemented method of selecting query objects, comprising:
    based on identifying a digital image comprising a plurality of detectable objects, receiving user input from a client device comprising a selection query indicating a target query object to be selected within the digital image;

analyzing the selection query to identify a first detection input comprising a query object and a second detection input comprising an object attribute that corresponds to the query object;

based on the first detection input, detecting multiple instances of the query object in the digital image from the plurality of detectable objects utilizing an object detection neural network;

based on the second detection input, selecting, from among a plurality of object attribute detection models designed to identify respective object attributes, an object attribute detection model specifically trained to identify the object attribute;

determining that a first query object instance from the multiple query object instances is the target query object by utilizing the object attribute detection model to determine that the first query object instance reflects the object attribute by analyzing object masks for the multiple query object instances to identify which of the object masks include the object attribute by determining that a first relative position for the first query object instance corresponds to the object attribute based on comparing a first center position of the first query object instance to a second center position of a second query object instance of the multiple query object instances to identify the first relative position for the first query object instance; and providing, to the client device, the digital image with the first query object instance selected for editing within the digital image in response to the selection query.

19. The computer-implemented method of claim 18, further comprising:

generating bounding boxes for each of the multiple query object instances; and wherein identifying positions for each of the multiple query object instances in the digital image is based on the bounding boxes generated for each of the multiple query object instances.

20. The computer-implemented method of claim 19, further comprising:

generating, utilizing an object mask neural network, a first object mask for the first query object instance without generating additional object masks for other query object instances of the multiple query object instances; and utilizing the first object mask to select the first query object instance within the image.

* * * * *